US 8,050,085 B2

(12) United States Patent
Takahashi et al.

(10) Patent No.: US 8,050,085 B2
(45) Date of Patent: Nov. 1, 2011

(54) SEMICONDUCTOR PROCESSING DEVICE AND IC CARD

(75) Inventors: Masatoshi Takahashi, Kodaira (JP); Takanori Yamazoe, Hadano (JP); Kozo Katayama, Tokyo (JP); Toshihiro Tanaka, Akiruno (JP); Yutaka Shinagawa, Iruma (JP); Hiroshi Watase, Kodaira (JP); Takeo Kanai, Kodaira (JP); Nobutaka Nagasaki, Iruma (JP)

(73) Assignees: Renesas Electronics Corporation, Kawasaki-shi (JP); Hitachi ULSI Systems Co., Ltd., Tokyo (JP)

( * ) Notice: Subject to any disclaimer, the term of this patent is extended or adjusted under 35 U.S.C. 154(b) by 1211 days.

(21) Appl. No.: 10/521,553

(22) PCT Filed: Aug. 29, 2002

(86) PCT No.: PCT/JP02/08757
§ 371 (c)(1),
(2), (4) Date: Sep. 5, 2006

(87) PCT Pub. No.: WO2004/023385
PCT Pub. Date: Mar. 18, 2004

(65) Prior Publication Data
US 2009/0213649 A1    Aug. 27, 2009

(51) Int. Cl.
*G11C 7/10* (2006.01)
*G11C 11/40* (2006.01)
(52) U.S. Cl. .................. 365/184; 365/189.04
(58) Field of Classification Search ............ 365/185.01, 365/185.05, 185.23, 185.33, 189.14, 189.04, 365/184; 713/182–184; 257/314–319
See application file for complete search history.

(56) References Cited

U.S. PATENT DOCUMENTS

| 5,553,016 | A  |   | 9/1996 | Takebuchi ................... 365/51 |
|---|---|---|---|---|
| 5,612,913 | A  |   | 3/1997 | Cappelletti ............. 365/185.12 |
| 5,748,538 | A  | * | 5/1998 | Lee et al. ................ 365/185.06 |
| 5,763,308 | A  | * | 6/1998 | Choi ............................ 438/261 |
| 5,768,194 | A  |   | 6/1998 | Matsubara et al. ...... 365/185.33 |
| 6,097,059 | A  |   | 8/2000 | Yamada ..................... 257/321 |
| 6,289,455 | B1 | * | 9/2001 | Kocher et al. ............... 713/194 |

(Continued)

FOREIGN PATENT DOCUMENTS

JP        59-21058        2/1984

(Continued)

*Primary Examiner* — VanThu Nguyen
*Assistant Examiner* — Douglas King
(74) *Attorney, Agent, or Firm* — Miles & Stockbridge P.C.

(57) ABSTRACT

A semiconductor processing device according to the invention includes a first non-volatile memory (21) for erasing stored information on a first data length unit, a second non-volatile memory (22) for erasing stored information on a second data length unit, and a central processing unit (2), and capable of inputting/outputting encrypted data from/to an outside. The first non-volatile memory is used for storing an encryption key to be utilized for encrypting the data. The second non-volatile memory is used for storing a program to be processed by the central processing unit. The non-volatile memories to be utilized for storing the program and for storing the encryption key are separated from each other, and the data lengths of the erase units of information to be stored in the non-volatile memories are defined separately. Therefore, the stored information can efficiently be erased before the execution of a processing of writing the program, and the stored information can be erased corresponding to the data length of a necessary processing unit in the write of the encryption key to be utilized in the calculation processing of the CPU.

17 Claims, 32 Drawing Sheets

U.S. PATENT DOCUMENTS

| | | |
|---|---|---|
| 6,400,603 B1 | 6/2002 | Blyth et al. |
| 6,531,735 B1 | 3/2003 | Kamigaki et al. |
| 6,572,015 B1 * | 6/2003 | Norton .......................... 235/382 |
| 6,862,223 B1 * | 3/2005 | Lee et al. ................. 365/185.33 |
| 7,437,571 B1 * | 10/2008 | Cocchi et al. ................. 713/193 |
| 2002/0065782 A1 * | 5/2002 | DeFilippo et al. .............. 705/62 |
| 2002/0074594 A1 | 6/2002 | Katayama et al. |
| 2002/0174382 A1 * | 11/2002 | Ledford et al. ................. 714/30 |
| 2003/0017672 A1 * | 1/2003 | Katayama et al. ............ 438/257 |

FOREIGN PATENT DOCUMENTS

| | | |
|---|---|---|
| JP | 63-266698 | 2/1988 |
| JP | 2-96378 | 4/1990 |
| JP | 3-126265 | 5/1991 |
| JP | 4-364077 | 12/1992 |
| JP | 5-266219 | 10/1993 |
| JP | 7-326684 | 12/1995 |
| JP | 10-107231 | 4/1998 |
| JP | 10-198776 | 7/1998 |
| JP | 10-334205 | 12/1998 |
| JP | 2000-21183 | 1/2000 |
| JP | 2000-90676 | 3/2000 |
| JP | 2001-156275 A | 6/2001 |
| JP | 2002-164449 A | 6/2002 |
| WO | WO 01/84556 A1 | 11/2001 |

* cited by examiner

|  | VD | VCG | VMG | VS | Vsub |
|---|---|---|---|---|---|
| Read | 1.5V | 1.5V | 0V | 0V | 0V |
| Write | 0.5V | 1.5V | 10V | 6V | 0V |
| Erase | 0V | 1.5V | 12V | 0V | 0V |

SEMICONDUCTOR PROCESSING DEVICE AND IC CARD

FIELD OF THE INVENTION

The present invention relates to a semiconductor processing device such as a microcomputer for an IC card and the IC card, and to an effective technique to be applied to the microcomputer for the IC card which has an electrically rewritable non-volatile memory, for example.

BACKGROUND OF THE INVENTION

As an electrically rewritable (A word of rewritable means that it is programmable) non-volatile memory, there has been proposed a so-called flash memory capable of carrying out a write processing and an erase processing on a comparatively large unit such as a batch erase processing on a memory block unit and a page write processing on a word line unit or an EEPROM (Electrically Erasable and Programmable Read Only Memory) capable of carrying out a write processing and an erase processing on a unit of a byte or word to be a calculation processing unit by a CPU. A microcomputer for carrying out on-chip over the EEPROM and a microcomputer for carrying out the on-chip over the flash memory have been proposed, respectively. An example of the document describing the former microcomputer includes JP-A-63-266698. An example of the document describing the latter microcomputer includes JP-A-05-266219.

SUMMARY OF THE INVENTION

In the microcomputer for carrying out the on-chip over the EEPROM, the operation program of a CPU is provided by an on-chip mask ROM and a time is required for system debugging for the program to be provided by the mask ROM when a new program is to be developed, and a TAT (Turn Around Time) is hindered from being shortened.

In the microcomputer for carrying out the on-chip over the flash memory, moreover, if the flash memory is to be utilized as in the work area of the CPU, the unit of the erase processing is not matched with the data processing unit of the CPU. For example, it is difficult to transfer data on a word unit to the flash memory in response to the data transfer instruction of the CPU and to rewrite the same data.

In the case in which a virtual machine language program is used, moreover, it is necessary to increase the capacity of a program memory so that a chip occupancy area is obliged to be increased. In an EEPROM capable of carrying out the write and erase processings of data on a unit of a byte or a word, a switch unit for selecting a memory cell on the unit of the byte or the word is required. Correspondingly, the chip occupancy area is more increased as compared with the flash memory. The factor of such an increase in the chip occupancy area is hard to disregard in IC card uses in which a chip area is limited at a request of a strength against bending.

It is an object of the invention to provide a semiconductor processing device capable of implementing an increase in a capacity and a reduction in a size of an on-chip non-volatile memory to be utilized for storing data and a program, and furthermore, an IC card.

It is another object of the invention to provide a semiconductor processing device capable of enhancing the reliability of information storage for necessary information and implementing a reduction in a size when an on-chip non-volatile memory is utilized for storing data and a program, and furthermore, an IC card.

The above and other objects and novel features of the invention will be apparent from the following description of this specification and the accompanying drawings.

[1] A semiconductor processing device according to the invention comprises a first non-volatile memory for erasing stored information on a first data length unit, a second non-volatile memory for erasing stored information on a second data length unit, and a central processing unit, and can input/output encrypted data from/to an outside. The first non-volatile memory is used for storing an encryption key to be used for encrypting the data. The second non-volatile memory is used for storing a program to be processed by the central processing unit. The non-volatile memories to be utilized for storing the program and storing the encryption key are divided, and data lengths on the unit of the erase of the stored information for the respective non-volatile memories are specified separately. Therefore, it is possible to efficiently erase the stored information before carrying out a processing of writing a program, and to erase the stored information corresponding to a necessary data length (for example, 8 bits) on a processing unit in the write of the encryption key to be utilized for the calculation processing of the CPU. A switch unit for separating a memory cell for each data length on the processing unit is not required for the second non-volatile memory for storing the program. In this respect, it is possible to implement a reduction in the circuit scale of the second non-volatile memory requiring a large capacity for storing the program. As compared with the case in which both the program and the data are to be stored in the first non-volatile memory, it is possible to attain a reduction in the size of the non-volatile memory to be on-chipped over the semiconductor processing device. Correspondingly, a storage capacity can be increased.

As a specific mode of the invention, it is possible to further use the first non-volatile memory in order to store information having the first data length to be utilized for specifying an individual.

In a desirable mode of the invention, as is apparent from the foregoing, it is preferable that the first data length should be smaller than the second data length.

A further specific mode of the invention, it is desirable that the semiconductor processing device should have a terminal to be used for an input/output from/to an outside, and the program should be supplied from the outside through the terminal and be stored in the second non-volatile memory. It is possible to easily store the program through the terminal.

In consideration of an increase in the efficiency of a data processing, it is desirable that the central processing unit can carry out an access processing over the first non-volatile memory and the second non-volatile memory in parallel.

It is considered that a chip occupancy area surface by the non-volatile memory is to be further reduced. More specifically, it is preferable that the first non-volatile memory should have a memory array portion constituted by a plurality of memory cells and a control portion for controlling access to a selected memory cell, the second non-volatile memory should have a memory array portion constituted by a plurality of memory cells and a control portion for controlling access to a selected memory cell, and the control portion of the first non-volatile memory and the control portion of the second non-volatile memory should be common at least partially in this case.

As a specific mode, a part of the control portion to be common is an amplifier circuit to be used for amplifying a read signal when data are to be read from a memory cell. Moreover, a part of the control portion to be common is a voltage generating circuit for generating a voltage to be applied to a memory cell when access is to be given to the memory cell. Furthermore, a part of the control portion to be common is a decoder circuit for selecting a memory cell when access is to be given to the memory cell. In the case in which the decoder circuit is to be made common, it is desirable that the memory cells in both of the non-volatile memories should have identical circuit structures to each other. The pitches of the memory cells are equal to each other and the wiring pitch of a signal line for selecting the memory cell can be equalized in both of the non-volatile memories.

[2] An IC card according to the invention comprises a first non-volatile memory for erasing stored information on a first data length unit, a second non-volatile memory for erasing stored information on a second data length unit, a central processing unit, and a terminal for inputting/outputting data from/to an outside which are enclosed with a synthetic resin. Encrypted data are input/output from/to the outside. The first non-volatile memory is used for storing an encryption key to be utilized for encrypting the data. The second non-volatile memory is used for storing a program to be processed by the central processing unit. In the same manner as in the semiconductor processing device, it is possible to efficiently erase the stored information before carrying out a processing of writing a program, and to erase the stored information corresponding to a necessary data length on a processing unit in the write of the encryption key to be utilized for the calculation processing of the CPU. As compared with the case in which both the program and the data are to be stored in the first non-volatile memory, moreover, it is possible to attain a reduction in the size of the non-volatile memory to be on-chipped over the semiconductor processing device, and correspondingly, it is possible to increase a storage capacity.

In the case in which a non-contact interface is to be carried out with the outside, it is preferable that an antenna for inputting/outputting data from/to the outside should be mounted on the IC card.

The central processing unit, the first non-volatile memory and the second non-volatile memory may be formed on a single semiconductor substrate. Furthermore, the central processing unit and the first non-volatile memory may be formed on a first semiconductor substrate and the second non-volatile memory may be formed on a second semiconductor substrate. A nitride film may be used for the memory cell in order to store data in the first non-volatile memory. The nitride film is an insulating film having such a property as to trap an electric charge and is more excellent in a performance for holding the stored information as compared with the case in which the floating gate of a conductor is used. It is impossible to prevent the floating gate from being used in the memory cell of the non-volatile memory.

[3] A semiconductor processing device according to the invention in another respect comprises a first non-volatile memory for erasing stored information on a first data length unit, a second non-volatile memory for erasing stored information on a second data length unit, and a central processing unit and can input/output encrypted data from/to an outside. Each of the first non-volatile memory and the second non-volatile memory has a plurality of memory cells. Each of the memory cells has a source region, a drain region and a channel region between the source region and the drain region, has a data storage insulating layer and a first gate on the channel region through an insulating layer, and has a second gate on the data storage insulating layer. Each of the first non-volatile memory and the second non-volatile memory has a plurality of first word lines, corresponding memory cells are connected to the first word lines when the stored information is erased from the first non-volatile memory, corresponding memory cells are connected to the first word lines when the stored information is erased from the second non-volatile memory, and the number of the memory cells to be connected to the first word lines in the first non-volatile memory is smaller than that of the memory cells to be connected to the first word lines in the second non-volatile memory. Consequently, the data length on the unit of the erase of the stored information for the first non-volatile memory is smaller than the data length on the unit of the erase of the storage information for the second non-volatile memory. Accordingly, the non-volatile memories to be utilized for storing a program and storing data are divided, and unit data lengths in the execution of the erase of the storage information are defined for the respective non-volatile memories separately. Therefore, it is possible to efficiently erase the stored information before carrying out a processing of writing a program, and to erase the stored information corresponding to a necessary data length on a processing unit in the processing of writing the encryption key to be utilized for the calculation processing of the CPU. A switch unit for separating the memory cell for each data length on the necessary processing unit is not required for the second non-volatile memory for storing the program. In this respect, it is possible to implement a reduction in the circuit scale of the second non-volatile memory requiring a large capacity for storing the program. As compared with the case in which both the program and the data are to be stored in the first non-volatile memory, it is possible to attain a reduction in the size of the non-volatile memory to be on-chipped over the semiconductor processing device, and correspondingly, it is possible to increase a storage capacity. Since a data storage insulating layer is employed for the memory cells of both of the non-volatile memories, furthermore, an excellent performance for holding the stored information can be obtained. Moreover, it is also possible to carry out a write to the data storage insulating layer by injecting a hot electron with a current to be controlled by the first gate.

As a specific mode of the invention, the same number of second word lines as that of the first word lines are provided, the first word line is connected to the second gate of each of the memory cells and the second word line is connected to the first gate of each of the memory cells. In the first non-volatile memory, moreover, there is provided a switch unit capable of connecting the second gate of a part of the memory cells to be an erasing object of stored information to the first word line when erasing the stored information. The switch unit implements a switch for separating the memory cells on the data length unit of the erase of the stored information. The switch unit is an MOS transistor of the same conductive type as the non-volatile memory cell. In the case in which the conductive types are different from each other, the switch unit is to be formed in a well region. Therefore, a chip occupancy area is increased.

[4] A semiconductor processing device according to the invention in respect of a further respect comprises a first non-volatile memory for erasing stored information on a first data length unit, a second non-volatile memory for erasing stored information on a second data length unit, a central processing unit, and an external interface circuit. The first non-volatile memory is used for storing data, the second non-volatile memory is used for storing a program to be processed by the central processing unit, and the first data length is smaller than the second data length. In the same manner as described above, it is possible to efficiently erase the stored information before carrying out a processing of writing a program, and to erase the stored information corresponding to a necessary data length on a processing unit in the processing of writing the encryption key to be utilized for the calculation processing of the CPU. As compared with the case in which both the program and the data are to be stored in the first non-volatile memory, moreover, it is possible to attain a reduction in the size of the non-volatile memory to be on-chipped over the semiconductor processing device, and correspondingly, it is possible to increase a storage capacity.

As a specific mode of the invention, the non-volatile memory cell has a source region, a drain region, and a channel region interposed between the source region and the drain region on a semiconductor substrate, a control gate electrode provided through a first insulating film and a memory gate electrode provided through a second insulating film and an electric charge storage insulating film and isolated electrically from the control gate electrode are provided on the channel region, and a gate breakdown voltage of the control gate electrode is lower than that of the memory gate electrode. For example, the gate breakdown voltage of the control gate electrode is equal to that of an MOS transistor included in the CPU.

For the MOS transistor portion for a selection which has the control gate electrode, comparatively large Gm (a mutual conductance) can easily be obtained at a comparatively low gate voltage because of a relatively low insulating breakdown voltage. Thus, it is possible to relatively increase Gm for a read current from the non-volatile memory cell, thereby contributing to an increase in a reading speed.

In order to set a threshold voltage seen from the memory gate of the non-volatile memory cell to be comparatively high, it is preferable that a high voltage should be applied to a memory gate electrode, a control gate electrode side should be turned ON to cause a current to flow from a source line to a bit line, and an electron generated in the vicinity of an electric charge storing region on the control gate electrode side should be held in the electric charge storage region, for example. To the contrary, in order to set a comparatively low threshold voltage, it is preferable that a high voltage should be applied to the memory gate electrode, the control gate electrode side should be turned ON to set a bit line connecting electrode and a source line connecting electrode to have the ground potential of a circuit, and the electron held in the electric charge storage region should be discharged to the memory gate electrode, for example. Accordingly, it is possible to implement an operation for setting a comparatively low threshold voltage or a comparatively high threshold voltage to the non-volatile memory cell without applying a high voltage to a control gate control line and a bit line. This guarantees that a gate breakdown voltage on the control gate electrode side may be set to be comparatively low.

As a specific mode of the invention, the first non-volatile memory holds, on the first data length unit, information in a memory cell from which stored information is erased on the first data length unit. The second non-volatile memory holds, on a shorter unit than the second data length, information in a memory cell from which stored information is erased on the second data length unit.

[5] An IC card according to the invention in a further respect comprises a first non-volatile memory for erasing stored information on a first data length unit, a second non-volatile memory for erasing stored information on a second data length unit, a central processing unit, and a terminal for inputting/outputting data from/to an outside which are enclosed with a synthetic resin. The first non-volatile memory is used for storing data. The second non-volatile memory is used for storing a program to be processed by the central processing unit. The first data length is smaller than the second data length. An antenna for inputting/outputting data from/to an outside may be provided together with a terminal for inputting/outputting data to/from the outside or in place of the same terminal.

It is also possible to employ a memory cell structure in which the non-volatile memory cell is constituted by the selecting transistor portion and a memory cell transistor portion and the insulating breakdown voltage of the selecting transistor portion is set to be lower than that of the memory cell transistor portion.

[6] A semiconductor processing device according to the invention in a further respect is constituted in the same manner as described above, in which the CPU is omitted and the first non-volatile memory and the second non-volatile memory are provided mainly.

DETAILED DESCRIPTION OF THE PREFERRED EMBODIMENTS

Microcomputer

Figure 1:
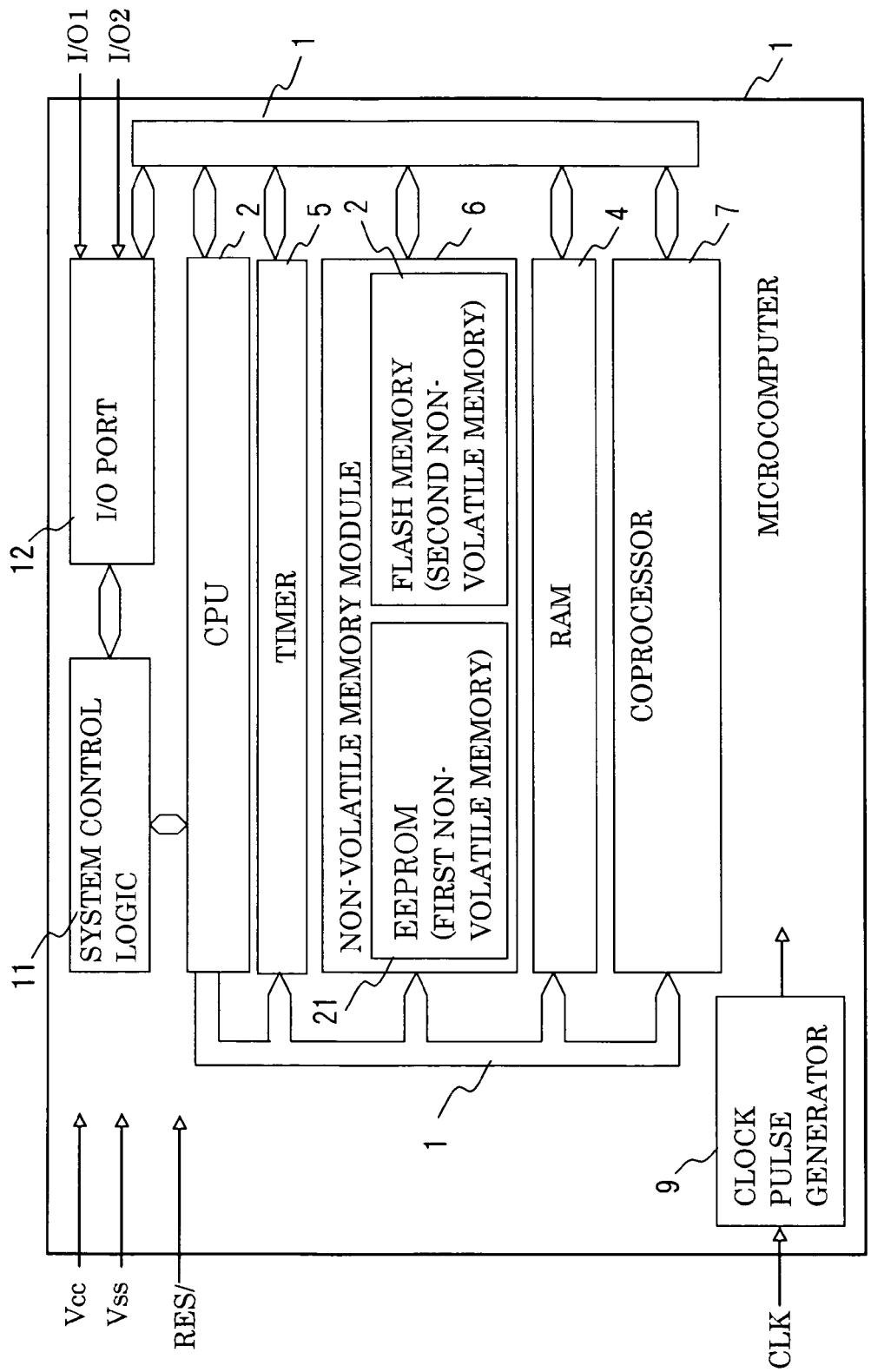
FIG. 1 is a block diagram showing a microcomputer according to an example of a semiconductor processing device according to the invention.

FIG. 1 illustrates a microcomputer as an example of a semiconductor processing device according to the invention. A microcomputer 1 shown in FIG. 1 is not particularly restricted but is a microcomputer referred to as a so-called IC card microcomputer. The microcomputer 1 shown in FIG. 1 is formed by a technique for manufacturing a semiconductor integrated circuit such as a CMOS on a semiconductor substrate or semiconductor chip, for example, monocrystalline silicon.

The microcomputer 1 has a CPU 2, an RAM (random access memory) 4, a timer 5, a non-volatile memory module 6, a coprocessor 7, a clock pulse generator 9, a system control logic 11, an input/output port (I/O port) 12, a data bus 13 and an address bus 14.

The non-volatile memory module 6 is utilized for storing the operation program and data of the CPU 2. The RAM 4 is set to be the work area of the CPU 2 or a temporary storage area for data, and is constituted by an SRAM (Static Random Access Memory) or a DRAM (Dynamic Random Access Memory), for example. The CPU 2 fetches an instruction from the non-volatile memory module 6, decodes the instruction thus fetched, and carries out an operand fetch and a data calculation based on the result of the decode. The coprocessor 7 is a processor unit for carrying out a residue multiplication processing in an RSA or an elliptic curve encryption calculation in place of the CPU 2. The I/O port 12 has 2-bit input/output terminals I/01 and I/02, and is used for inputting/outputting data and inputting an external interruption signal. The I/O port 12 is coupled to the data bus 13, and the CPU 2, the RAM 4, the timer 5, the non-volatile memory module 6 and the coprocessor 7 are connected to the data bus 13. In the microcomputer 1, the CPU 2 is set to be a bus master module and can output an address signal to the address bus 14 connected to the RAM 4, the timer 5, the non-volatile memory module 6 and the coprocessor 7. The system control logic 11 controls the operation mode of the microcomputer 1 and carries out an interruption control, and furthermore, has a random number generation logic to be utilized for generating an encryption key. RES/denotes a reset signal for the microcomputer 1. When an instruction for a reset operation is given to the microcomputer 1 by the reset signal RES/, an inner part is initialized and the CPU 2 starts to execute an instruction from the starting address of the program of the non-volatile memory module 6. The clock pulse generator 9 generates an internal clock signal CK upon receipt of an external clock signal CLK. The microcomputer 1 is operated synchronously with the internal clock signal CK.

The CPU 2 is a so-called 32-bit CPU and can carry out a calculation processing on a 32-bit (word) unit, which is not particularly restricted, and has a 32-bit general purpose register and a 32-bit arithmetic logic unit which are not shown and the data bus 13 is set to have 32 bits. Accordingly, most of a data transfer instruction and a calculating instruction which are included in the instruction set of the CPU 2 can process data on a 32-bit unit.

The non-volatile memory module 6 has an EEPROM 21 and a flash memory 22 in which an erase processing and a write processing can be electrically carried out respectively, which is not particularly restricted. The erase processing is a method of erasing stored information held in a memory cell, and implies a processing of dropping the threshold voltage of the memory cell, for example. A state in which the threshold voltage of the memory cell to be implemented by this processing is low will be referred to as an erase state. The write processing is a method of holding information in the memory cell, and implies a processing of raising the threshold voltage of the memory cell, for example. A state in which the threshold voltage of the memory cell to be implemented by this processing is high will be referred to as a write state. The EEPROM 21 is an example of a first non-volatile memory for erasing the stored information on a first data length unit, and the erase processing can be carried out on an 8-bit unit and the write and read processings can be carried out on a 32-bit unit, for example. The flash memory 22 is an example of a second non-volatile memory for erasing the stored information on a second data length unit, and the write is carried out on a word line unit such as 1024 bits (page write), the erase processing is carried out on a block unit in which one word line or more is/are set to be the unit, and the read is carried out on a 32-bit unit. The EEPROM 21 is used as an area for storing data on a predetermined calculation processing unit such as an encryption key to be utilized for the encryption of input/output data or ID information to be used for specifying an individual. Herein, the predetermined calculation processing unit has 8 bits (1 byte), for example. The flash memory 22 is utilized for storing a program to be processed by the CPU 2. For example, a virtual machine language program, an encryption program and a decode program are stored.

The non-volatile memory to be utilized for storing a program and storing data such as the encryption key is divided into the EEPROM 21 and the flash memory 22, and data lengths on the erase unit of the stored information for the respective non-volatile memories are defined separately. Therefore, it is possible to efficiently erase the stored information before the processing of writing a program, and the stored information can be erased corresponding to the data length (for example, 8 bits) on a necessary calculation processing unit in the processing of writing an encryption key to be utilized in the calculation processing of the CPU 2. A switch unit for separating a memory cell for each data length on an 8-bit unit is not required for the flash memory 22 for storing a program. In this respect, it is possible to implement a reduction in the circuit scale of the flash memory 22 requiring such a large capacity as to store the program. As compared with the case in which both a program and data are to be stored in the EEPROM, it is possible to achieve a reduction in the size of the non-volatile memory module 6 to be on-chipped over the microcomputer. Correspondingly, a storage capacity can be increased. The microcomputer 1 shown in FIG. 1 inputs/outputs information to/from an outside and turns ON/OFF an operating power supply through an external terminal such as an electrode pad which is not shown.

Figure 2:
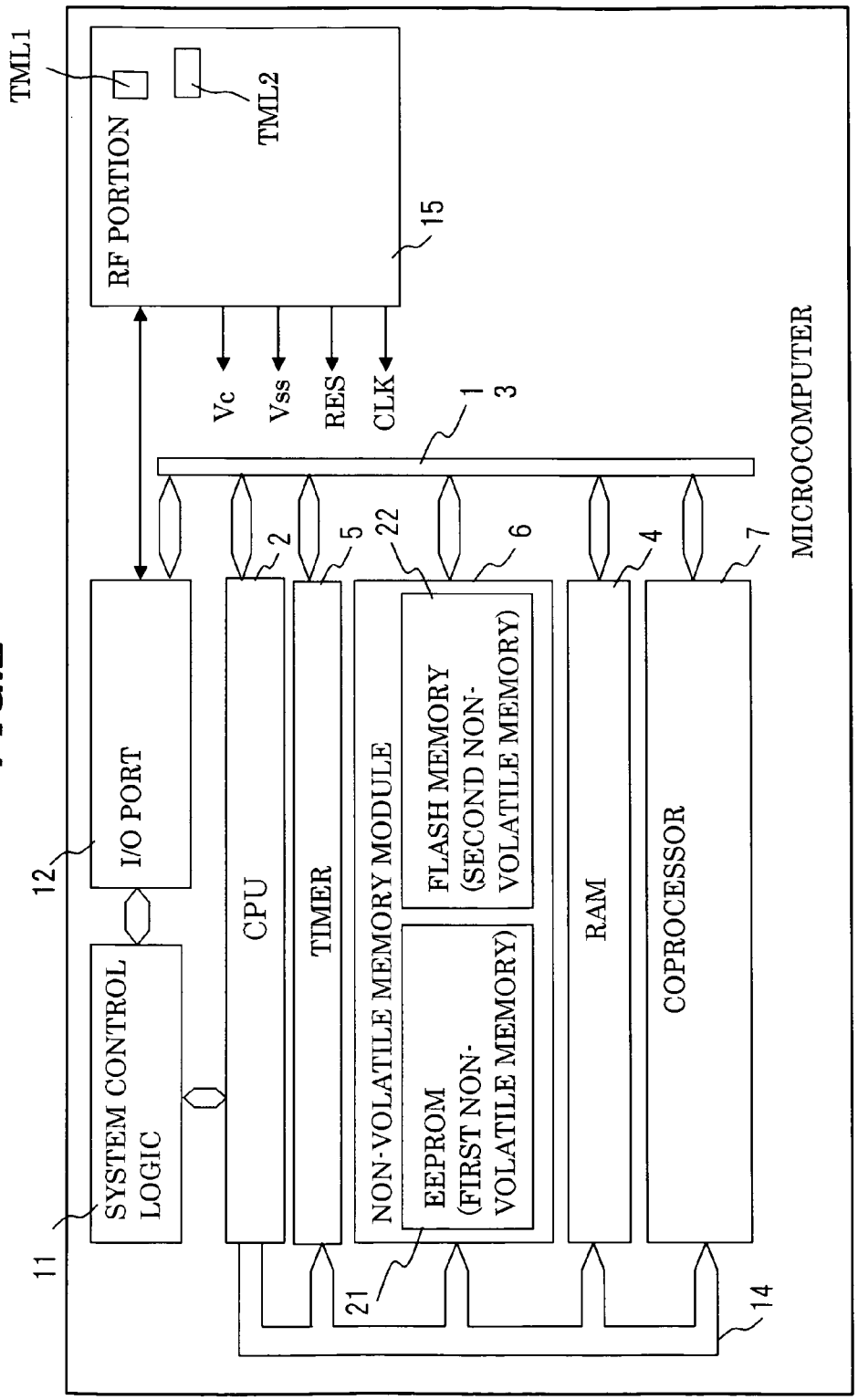
FIG. 2 is a block diagram showing another example of the microcomputer.

FIG. 2 shows another example of the microcomputer 1. The microcomputer 1 shown in FIG. 2 is different from the microcomputer in FIG. 1 in respect of external interface means. More specifically, the microcomputer in FIG. 2 comprises a high frequency portion 15 having antenna terminals TML1 and TML2 which can be connected to an antenna which is not shown. The high frequency portion 15 outputs a supply voltage Vcc by setting, as an operating power supply, an induced current generated by causing the antenna to cross a predetermined radio wave (for example, a microwave), generates a reset signal RES and a clock signal CK, and inputs/outputs information from the antenna in non-contact. The I/O port exchanges, together with the RF portion 15, information to be input/output to/from an outside.

<<Non-Volatile Memory Cell>>

Figures 3, 4:
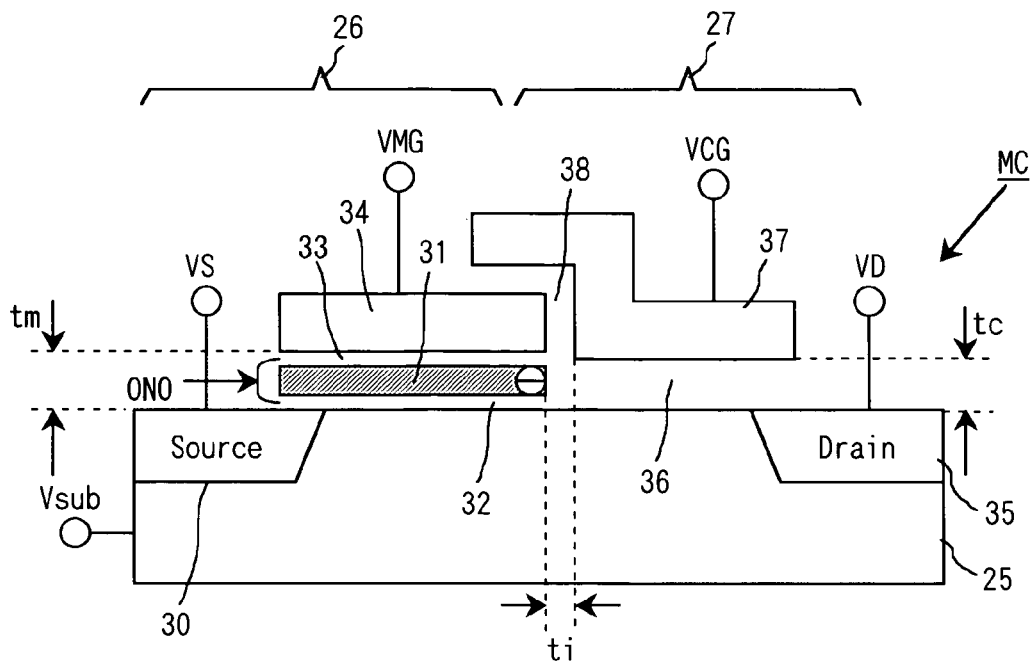
FIG. 3 is a longitudinal sectional view illustrating the structure of a non-volatile memory cell employed in an EEPROM and a flash memory.
FIG. 4 is an explanatory diagram illustrating a voltage application mode in the read and write processing and the erase processing of the memory cell.

FIG. 3 illustrates, in a longitudinal section, the structure of the non-volatile memory cells employed for the EEPROM 21 and the flash memory 22. Herein, the same non-volatile memory cell is used for the EEPROM 21 and the flash memory 22, which is not particularly restricted.

A non-volatile memory cell (simply referred to as a memory cell) MC illustrated in FIG. 3 is constituted to have an MOS type memory transistor portion 26 to be used for storing information and an MOS type selecting transistor portion 27 for selecting the memory transistor portion 26 in a p-type well region 25 provided on a silicon substrate. The memory transistor portion 26 has an n-type diffusion layer (an n-type impurity region) 30 to be a source line connecting electrode to be connected to a source line, an electric charge storage insulating film (for example, a silicon nitride film) 31, insulating films (for example, silicon oxide films) 32 and 33 provided on the upper and lower sides of the electric charge storage insulating film 31, and a memory gate electrode (for example, an n-type polysilicon layer) 34 for applying a high voltage in a write processing and an erase processing. For example, the insulating film 32 is set to have a thickness of 5 nm, the electric charge storage insulating film 31 is set to have a thickness of 10 nm (a silicon oxide film conversion), and the insulating film 33 is set to have a thickness of 3 nm. The selecting transistor portion 27 has an n-type diffusion layer (an n-type impurity region) 35 to be a bit line connecting electrode to be connected to a bit line, a gate insulating film (for example, a silicon oxide film) 36, a control gate electrode (for example, an n-type polysilicon layer) 37, and an insulating film (for example, a silicon oxide film) 38 for insulating the control gate electrode 37 from the memory gate electrode 34.

When the sum of the thicknesses of the electric charge storage insulating film 31 of the memory transistor portion 26 and the insulating film 32 and the insulating film 33 which are provided on a surface and a back thereof (which constitute a memory gate insulating film having an ONO (an oxide film, a nitride film, an oxide film) together is represented as tm, the thickness of the gate insulating film 36 of the control gate electrode 37 is represented as tc, and the thickness of the insulating film 38 provided between the control gate electrode 37 and the electric charge storage insulating film 31 is represented as ti, a relationship of tc<tm≦ti is realized. Based on the relationship between the thicknesses of the insulating films, the gate insulating breakdown voltage of the selecting transistor portion 27 is set to be lower than that of the memory transistor portion 26.

A word of a drain (Drain) described in the diffusion layer 35 portion implies that the diffusion layer 35 functions as the drain electrode of a transistor in a data reading operation and a word of a source (Source) described in the diffusion layer 30 portion implies that the diffusion layer 30 functions as the source electrode of the transistor in the data reading operation. In the erase processing and the write processing, the functions of the drain electrode and the source electrode are replaced with each other for the notation of the drain (Drain) and the source (Source) in some cases.

FIG. 4 illustrates a voltage application mode in the read, write and erase processings of the memory cell MC. There is shown an example of a memory cell manufactured according to a 0.18 μm process rule.

In the write processing operation in which a comparatively high threshold voltage is set to the memory transistor portion 26 of the memory cell MC, for example, 10V is applied to a memory gate voltage VMG, 6V is applied to a source line voltage VS, 1.5V is applied to a control gate voltage VCG, 1.5V is applied to a write state non-selecting bit line, and a lower voltage than 1.5V is applied to a write state selecting bit line to cause a constant current to flow. In the ON state of the selecting transistor portion 27 of the write state selecting bit line, a channel current is caused to flow from the diffusion layer 30 to the diffusion layer 35. By the channel current, a hot electron is generated in the vicinity of the electric charge storage insulating film 31 on the control gate electrode 37 side. The hot electron is held in the electric charge storage insulating film 31. In the case in which the write processing is to be carried out by setting a write processing current to flow to a bit line as a constant current of approximately several microamperes to several tens microamperes, it is preferable that approximately 0.8V should be applied to a write state selecting bit line potential so as to cause a channel current to flow, for example. In the write processing, the diffusion layer 30 functions as a drain and the diffusion layer 35 functions as a source for an n-channel type memory cell. The write processing form acts as a source side injection for the hot electron.

The write processing will be described in more detail. In the write processing, a channel positioned under the electric charge storage insulating film 31 is set to have a voltage of 6V up to the vicinity of the control gate electrode 37. On the other hand, a channel positioned under the control gate electrode 37 is set to have a voltage of approximately 0.8V. Consequently, a steep electric field (a sharp electric field) is formed in a boundary portion between both of the channels, that is, under the electric charge storage insulating film 31 on the control gate electrode 37 side. The hot electron is generated by the sharp electric field and is stored in the electric charge storage insulating film 31. Since the channel provided under the control gate electrode 37 has a voltage of approximately 0.8V, the insulating film 32 of the control gate electrode 37 may be a thin film which is the same or almost the same as most MOS transistors for a logical operation which do not require a high breakdown voltage such as a logical circuit.

The channel positioned under the control gate electrode 37 is not set to have a voltage of 6V in the write processing because a high concentration impurity region, for example, a diffusion layer is not formed between the bit line connecting electrode 35 and the source line connecting electrode 30 which are formed in the well region 25. In case of a non-volatile memory cell constituted by the series circuit of an MONOS (metal oxide nitride oxide semiconductor) type memory transistor for storage and holding and an MOS transistor for a selection, which is not shown, the series connecting node of both of the transistors is set to be a diffusion region (a source and drain region) which is common to both of them. In the case in which the diffusion region which is common to both of them is provided and a high voltage is applied to the MONOS to form a channel in the write processing, a high voltage on the MONOS side is applied from the same channel to the selecting MOS transistor through the diffusion region which is common to both of the transistors. Consequently, a high breakdown voltage is also required for the selecting MOS transistor.

In an erase processing in which a comparatively low threshold voltage is set to the memory transistor portion 26 of the memory cell MC, for example, a high voltage of 12V is applied to the memory gate voltage VMG and the electron held in the electric charge storage insulating film 31 is tunnel emitted to the memory gate electrode 34. At this time, the diffusion layer 30 is set to have a ground potential (0V) of the circuit. In this case, the selecting transistor portion 27 may be brought into an ON state.

As is apparent from the write processing and the erase processing for the memory transistor portion 26, the voltage VCG of the control gate 37 and a voltage VD of the bit line do not need to be high. This guarantees that the gate breakdown voltage of the selecting transistor portion 37 may be comparatively low.

Figure 5:
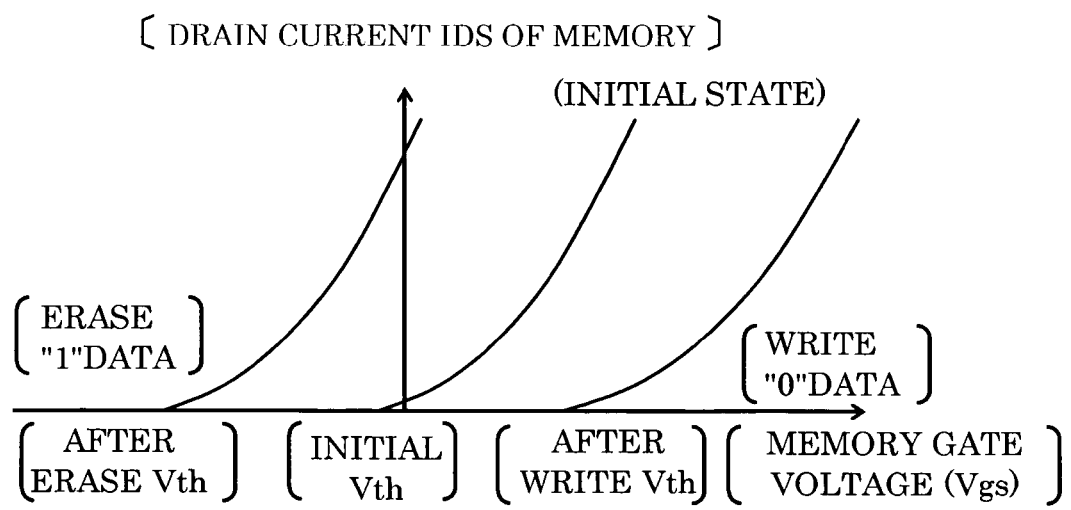
FIG. 5 is an explanatory chart illustrating the threshold voltage characteristic of the memory cell.

As illustrated in FIG. 5, the memory transistor portion 26 in an erase state in which a threshold voltage is dropped is set to be of a depression type and the memory transistor portion 27 in a write state in which the threshold voltage is raised is set to be of an enhancement type, which is not particularly restricted. In the erase state and the write state of FIG. 5, it is preferable that the memory gate electrode 34 in the reading operation should be set to have the ground voltage (0V) of the circuit. In the case in which the speed of the reading operation is increased, furthermore, a supply voltage (1.5V) may be applied to the memory gate electrode 34, for example. Both of the erase and write states are necessarily set to be of the enhancement type. In this case, the supply voltage is applied to the memory gate electrode 34 in the reading operation.

In the reading operation for the non-volatile memory cell MC in FIG. 3 in the threshold state of FIG. 5, it is preferable that the source line voltage VS and the memory gate voltage VMG should be set to be 0V and a control gate voltage Vcg of a memory cell to be read and selected should have a selection level of 1.5V. A bit line potential VD brings a precharge level of 1.5V into an initial state. When the selecting transistor portion 27 is brought into the ON state, the stored information is read onto a bit line depending on whether or not a current flows in accordance with the threshold voltage state of the memory transistor portion 26. The selecting transistor portion 27 has a smaller gate insulating film thickness than the memory transistor portion 26, and furthermore, has a lower gate breakdown voltage. As compared with the case in which both of the MOS transistor portion for storage and holding and the MOS transistor portion for a selection are to be formed at a high breakdown voltage, therefore, a read current Gm obtained by the selecting transistor portion 27 can be set to be comparatively large. Consequently, a data reading speed can be increased.

<<Byte Split>>

Figure 6:
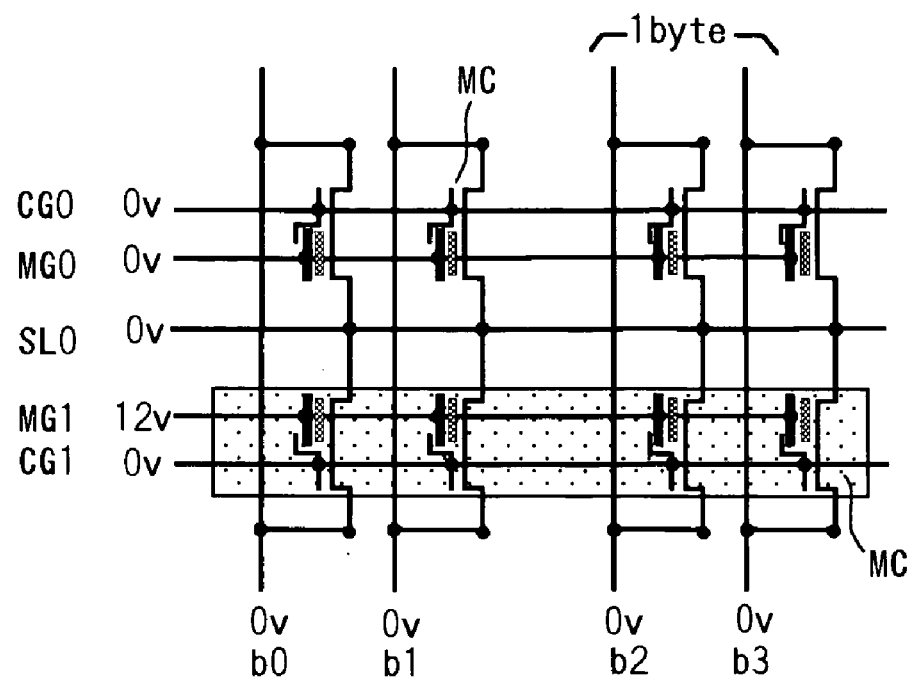
FIG. 6 is a circuit diagram showing the condition of a memory array in which a byte split is not employed as in the flash memory by taking an erase processing state as an example.

FIG. 6 shows the state of a memory array in which a byte split is not employed as in a flash memory by taking an erase processing state as an example. A memory gate electrode (34) of the memory cell MC is connected to memory gate control lines MG0 and MG1 on a row unit, and a control gate electrode (37) of the memory cell MC is connected to control gate control lines CG0 and CG1 on the row unit. A source line connecting electrode (30) of the memory cell MC for two rows is connected to a common source line SL0, and a bit line connecting electrode (35) of the memory cell MC is connected to bit lines b0 to b3 corresponding every column. By the memory array structure, the memory cell MC has the memory gate electrode (34) positioned on the common source line SL0 side and the control gate electrode (37) positioned on the bit line b0 to b3 side.

In the erase processing, as shown in FIG. 6, a high voltage (12V) is applied to the memory gate control line MG1 and the bit lines b0 to b3 are set to have the ground potential (0V) of the circuit to extract electrons stored in the electric charge storage insulating film (the silicon nitride film) 31 into the memory gate electrode MG1. The erase processing can be carried out on a memory gate control line unit. In FIG. 6, a memory cell for one row sharing the memory gate control line MG1 is subjected to a batch erase.

Figure 7:
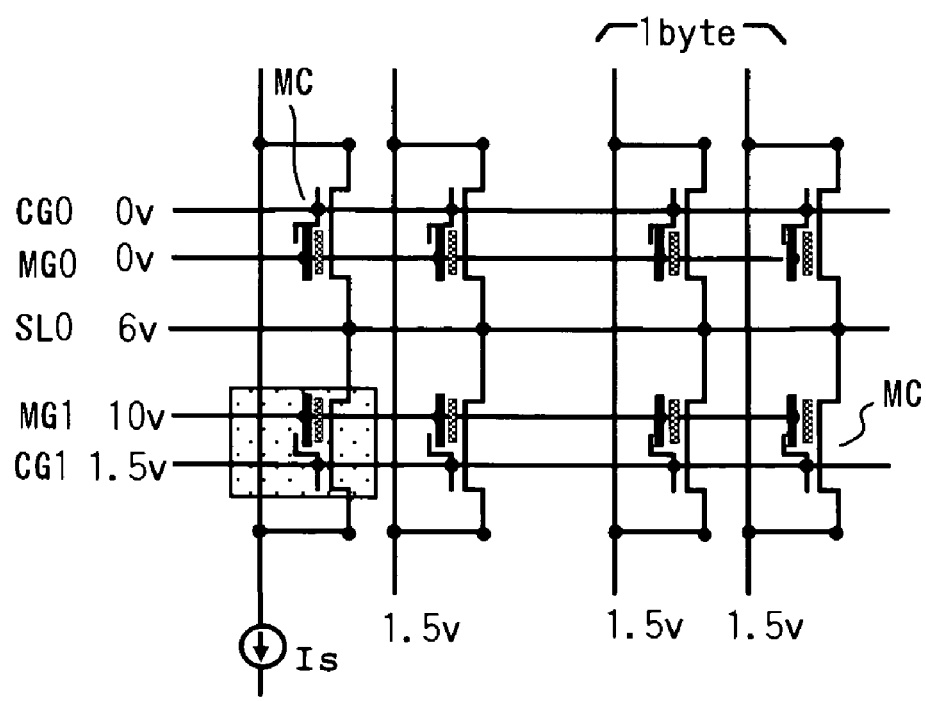
FIG. 7 is a circuit diagram illustrating a write processing state in the memory array of FIG. 6.

In the write processing, as illustrated in FIG. 7, a high voltage (10V) is applied to the memory gate control line MG1 and a selecting transistor portion (27) is conducted (the control gate control line CG1=a selection level (1.5V)), and furthermore, a high voltage (6V) is applied to the common source line SL0. A predetermined channel current is caused to flow from a write current source to a write state selecting bit line, thereby achieving a write state by a hot electron injection on a source side in order to compensate for a variation in the threshold voltage of the selecting transistor portion. 1.5V is applied to a write state non-selecting bit line, thereby suppressing a transition to the write state. In the drawing, the write current source is indicated as Is. Based on a relationship with the current supplying capability of a high voltage power supply for an application to the common source line at this time, it can be anticipated that the number of the memory cells capable of carrying out the write processing at a time is often smaller than an erase unit. In that case, the write processing is carried out in series separately at plural times.

As described above, the high voltage is not applied to the selecting transistor portion of the memory cell MC in the write and erase processings. Therefore, the thickness of the oxide film of the control gate electrode can be reduced and a current driving capability can be increased. Consequently, the speed of the reading operation can be increased.

Figure 8:
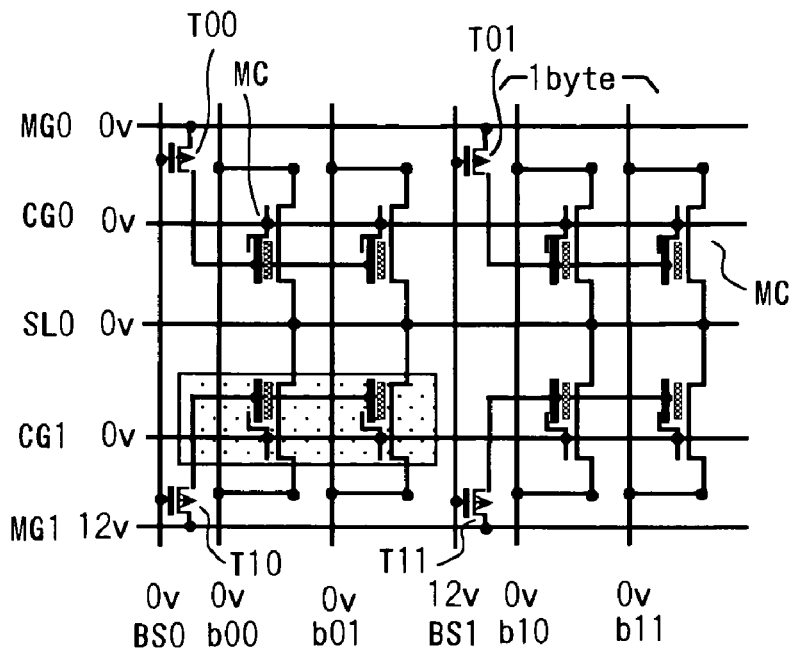
FIG. 8 is a circuit diagram showing the condition of a memory array in which the byte split is employed as in the EEPROM by taking an erase processing state as an example.

FIG. 8 shows the state of a memory array in which the byte split is employed as in an EEPROM by taking an erase processing state as an example. The basic structure of the memory array is the same as in FIG. 6. They are different from each other in that a memory gate electrode (34) of the memory cell MC is connected to a memory gate control line MGi through a byte selecting transistor Tij (i and j are integers) every byte in order to carry out the byte split. The switch control signal of the byte selecting transistor Tij is given through a byte selecting control line BSj on a byte column unit of the memory cell. In this example, a p-channel type MOS transistor (a pMOS transistor) is employed for the byte selecting transistor Tij in such a manner that a positive voltage applied to the memory gate control line MGi is not dropped through the byte selecting transistor Tij. For convenience, two memory cells are set to be a memory cell for one byte. A bit line is indicated as bj0 and bj1.

In FIG. 8, the erase processing is carried out on a byte unit. For example, one byte to be selected by a byte selecting transistor T10 is set to be an erasing object, for example. In this case, a byte selecting control line BS0 for a selecting byte is set to be 0V and a byte selecting control line BS1 for a non-selecting byte is set to be 12V. The memory gate control line MG0 for a non-selecting word is set to be 0V and the memory gate control line MG1 for a selecting word is set to be 12V. Consequently, the byte selecting transistor T10 is conducted, a erase voltage of 12V is applied to the memory gate electrode (34) of the memory cell for a selecting byte and the threshold of the memory cell for a selecting byte is decreased so that the erase state is brought.

Figure 9:
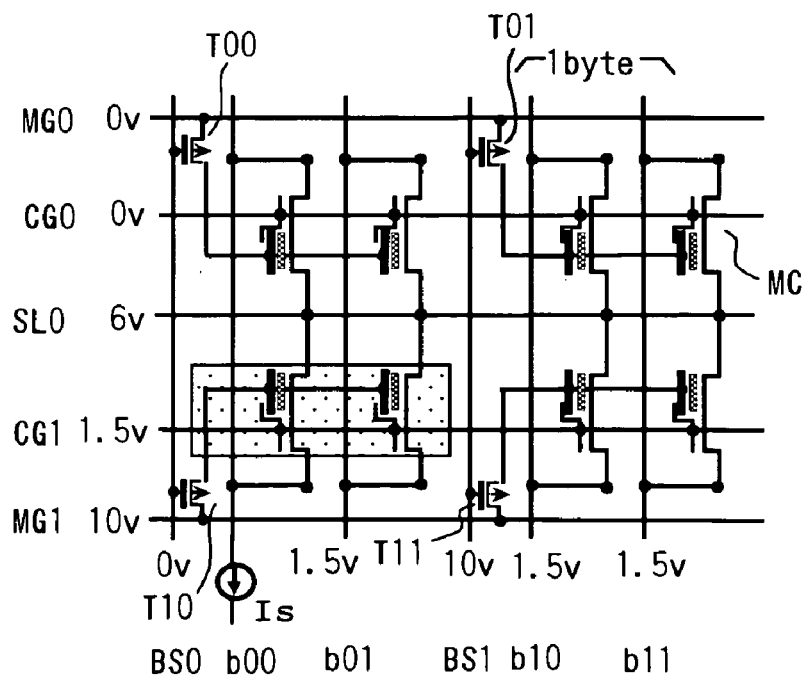
FIG. 9 is a circuit diagram illustrating a write processing state in the memory array of FIG. 8.

FIG. 9 illustrates a write processing state in the memory array in which the byte split is employed in FIG. 8. For convenience, one byte selected by the byte selecting transistor T10 is shown as a write processing object. In this case, the byte selecting control line BS0 for a selecting byte is set to be 0V and the byte selecting control line BS1 for a non-selecting byte is set to be 10V. When the memory gate control line MG0 for a non-selecting word is set to be 0V and the memory gate control line MG1 for a selecting word is set to be 10V, the byte selecting transistor T10 is conducted and 10V is applied to the memory gate electrode (34) of the memory cell for a selecting byte. Furthermore, the control gate control line CG0 for a non-selecting word is set to be 0V, the control gate control line CG1 for a selecting word is set to be 1.5V and 6V is applied to the source line SL0 for a selecting word, and the current source Is is connected to a bit line b00 for a write state selecting bit and 1.5V is applied to the bit line b01 for a write state non-selecting bit. 1.5V is also applied to the bit line for a non-selecting byte in the same manner as the write state non-selecting bit line. Consequently, the selecting transistor portion 27 of the write state selecting bit (the write selecting memory cell) is conducted so that a channel current flows by the constant current source Is, and a hot carrier is injected from the source side (the bit line connecting electrode 35 side) to the electric charge storage insulating film 31 so that the threshold of the write state selecting memory cell is increased to bring a write state.

Although a high voltage (6V) is applied from the source line SL0 to the source line connecting electrode for the write state non-selecting byte in the write processing, an electric charge stored in the memory cell is present in the electric charge storage insulating film (silicon nitride film) 31 on the control gate electrode 37 side. Therefore, a disturb can be suppressed.

Figure 10:
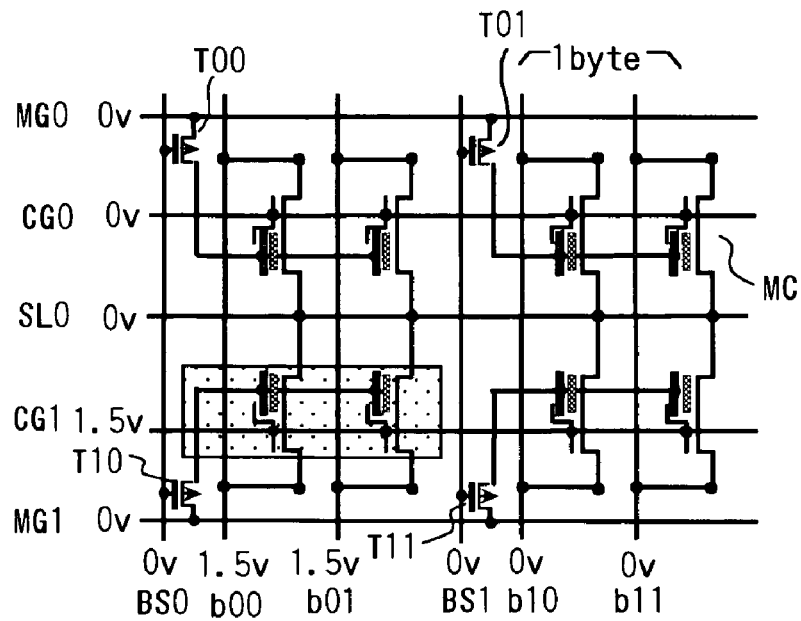
FIG. 10 is a circuit diagram illustrating a reading operation state in the memory array of FIG. 8.

FIG. 10 illustrates a reading operation state in the memory array in which the byte split is employed in FIG. 8. For convenience, one byte selected by the byte selecting transistor T10 is shown as a reading object. In this case, the bit lines b00 and b01 for a read selecting byte are precharged to 1.5V and the control gate control line CG1 for a selecting word is set to be 1.5V to conduct the selecting transistor portion 27 in the memory cell for the read selecting byte. The electric potential of the bit line is detected by a sense amplifier which is not shown.

As described with reference to FIGS. 8 to 10, in the memory array of the memory cell MC having a split gate type MONOS structure, the memory gate electrode (34) extended in the direction of the word line is constituted to be connected to the memory gate control line MGi through the byte selecting transistor Tij (i and j are integers), and a high write voltage and a high erase voltage are applied to the memory gate electrode (34) through the byte selecting transistor Tij. Consequently, it is possible to carry out an erase processing and a write processing on a byte unit. In the write processing and the erase processing, moreover, the high write voltage and the high erase voltage are applied to only the memory gate electrode (34) for a selecting byte. Therefore, a disturb is not applied to the non-selecting byte.

Figure 11:
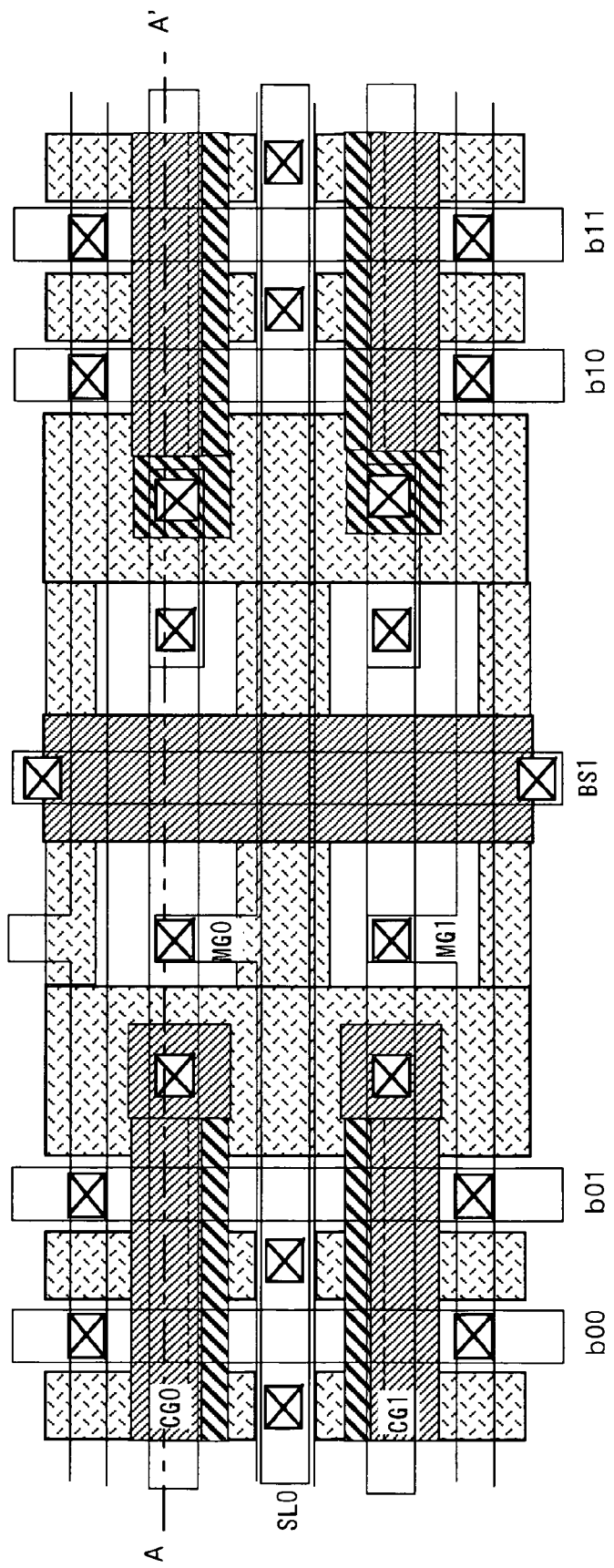
FIG. 11 is a planar layout diagram showing the device structure of a byte boundary portion in which a byte selecting transistor is provided in a memory array in which a pMOS transistor is used in a byte selecting transistor Tij described with reference to FIG. 8.
Figure 12:
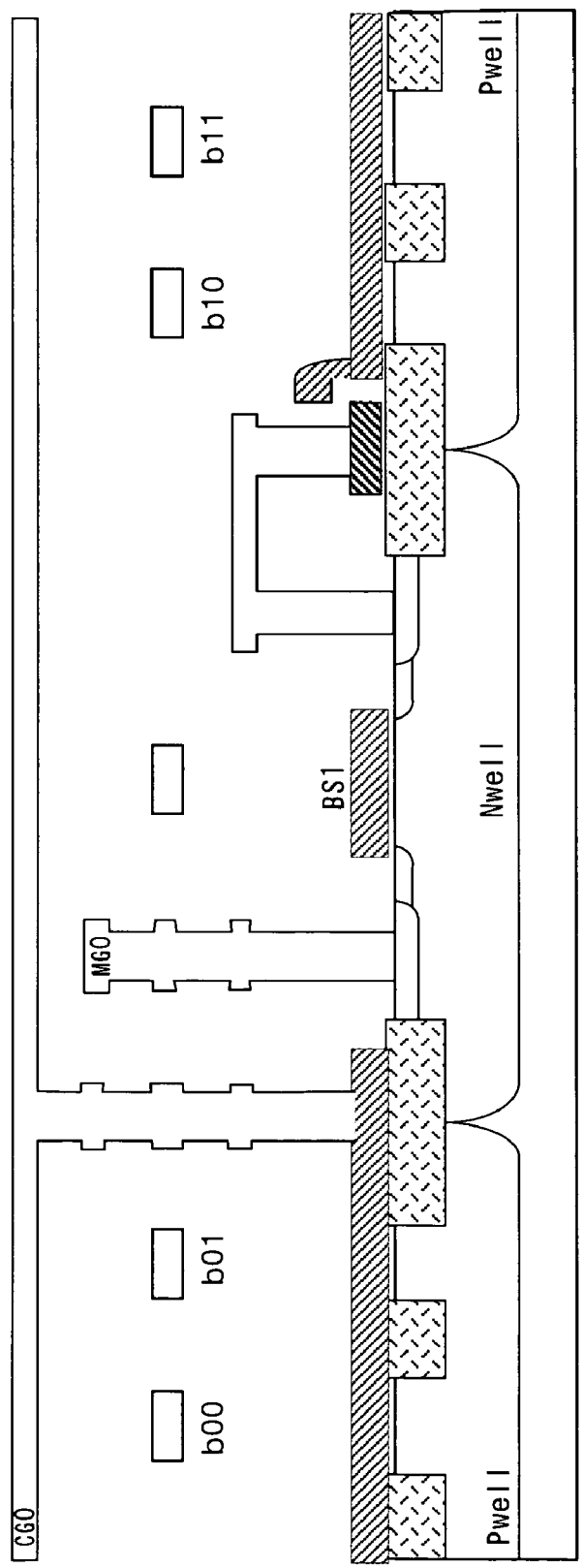
FIG. 12 is a sectional view taken along A-A' in FIG. 11.

FIG. 11 shows the planar layout of the device structure of a byte boundary portion in which a byte selecting transistor in a memory array using a PMOS transistor for the byte selecting transistor Tij described with reference to FIG. 8 is provided, and FIG. 12 shows a section taken along A-A' in FIG. 11. Since the byte selecting transistor Tij is the PMOS transistor and has a different conductive type from the memory cell, it is formed in an n-type well region (Nwell). The memory cell is formed in a p-type well region (Pwell). Both of the regions are to be electrically isolated from each other through an isolation region. For this reason, a comparatively large area is required for the n-type well region (Nwell).

Figure 13:
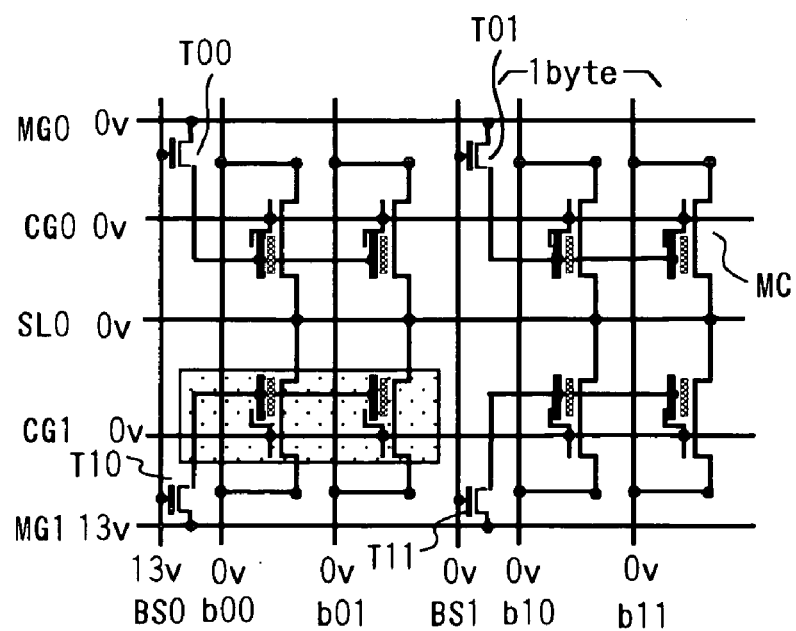
FIG. 13 is a circuit diagram showing the condition of a memory array in which an nMOS transistor is employed for the byte selecting transistor by taking an erase processing state as an example.
Figure 14:
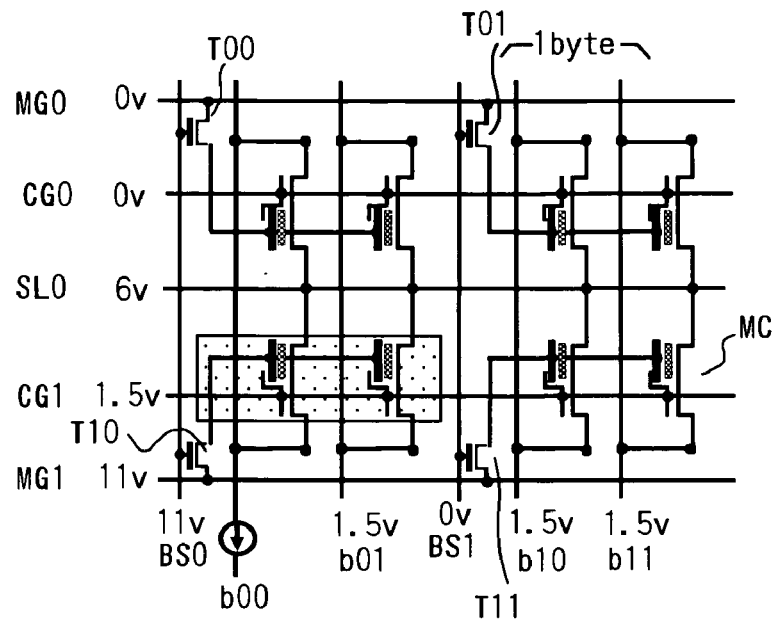
FIG. 14 is a circuit diagram illustrating a write processing state in the memory array of FIG. 13.
Figure 15:
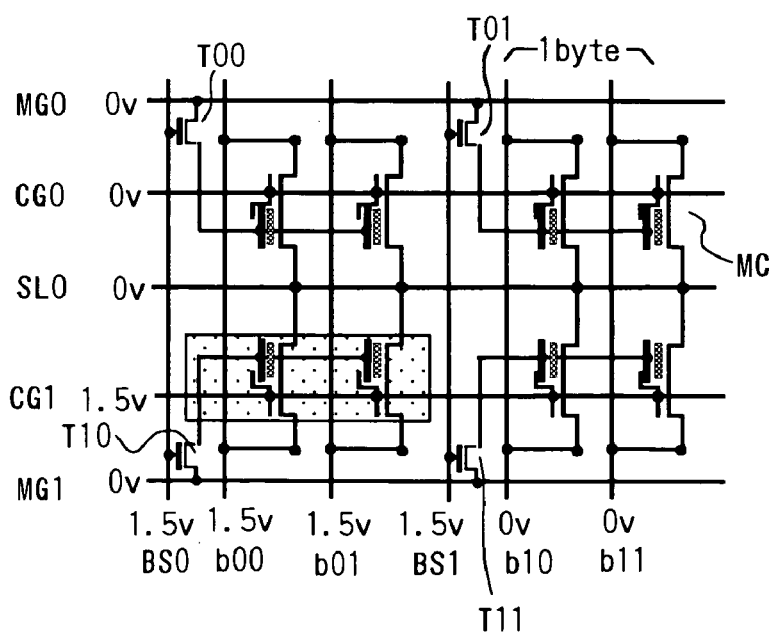
FIG. 15 is a circuit diagram illustrating a reading operation state in the memory array of FIG. 13.

FIG. 13 shows the state of a memory array in which an n-channel type MOS transistor (an nMOS transistor) is employed for the byte selecting transistor by taking an erase processing state as an example. The basic structure of the memory array is the same as that in FIG. 8 and is different in that the nMOS transistor is employed for the byte selecting transistor Tij. FIG. 14 illustrates a write processing state in a memory array in which a byte split is employed in FIG. 13. FIG. 15 illustrates a reading operation state in the memory array in which the byte split is employed in FIG. 13. In FIGS. 13 to 15, an operation object is set to be one byte selected by the byte selecting transistor T10, for example.

In the case in which the nMOS transistor is employed for the byte selecting transistor Tij, a high voltage (a raised voltage) in the erase processing and the write processing is set to be high in order to compensate for a drop in the voltage by the transistor Tij. For example, in the erase processing, a voltage applied to the memory gate control line MG1 is set to be high, that is, 13V as illustrated in FIG. 13. Correspondingly, the voltage applied to the byte selecting control line BS0 is also set to be high, that is, 13V. In the write processing, a voltage applied to the memory gate control line MG1 is set to be high, that is, 11V as illustrated in FIG. 14. Correspondingly, the voltage applied to the byte selecting control line BS0 is also set to be high, that is, 11V. On the other hand, in the reading operation, the byte selecting transistor Tij is conducted so that a voltage to be applied to the memory gate electrode of the memory cell can easily be set to be 0V. For example, it is sufficient that a voltage to be applied to the byte selecting control line BS0 for the selecting byte is set to be a supply voltage such as 1.5V in FIG. 15.

Moreover, the byte selecting transistor Tij is the nMOS transistor in the memory array of FIG. 13. For this reason, the N well region does not need to be formed in a portion of a byte boundary region. Consequently, the size of the memory array can be decreased.

Figure 16:
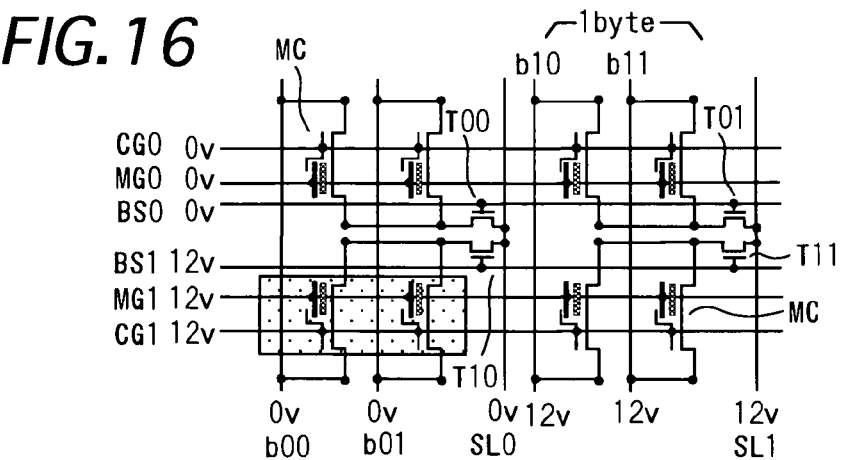
FIG. 16 is a circuit diagram showing the condition of a memory array in which the byte selecting transistor is provided on a source line side by taking an erase processing state as an example.

FIG. 16 shows the state of a memory array in which the byte selecting transistor is provided on the source line side by taking an erase processing state as an example. While the memory gate electrode is separated from the memory gate control line every byte in the byte split described above, a source line connecting electrode can be separated from a source line every byte. In FIG. 16, a source line SLj is provided for each byte column of the memory cell and the byte selecting transistor Tij is inserted between the source line connecting electrode (30) of the memory cell and a corresponding source line every byte. The switch control signal of the byte selecting transistor Tij is given through a byte selecting control line BSi on a row unit.

In FIG. 16, the erase processing is carried out on a byte unit. For example, one byte selected by the byte selecting transistor T10 is set to be an erasing object. In this case, the memory gate control line MG1 for a selecting word is set to be 12V and the memory gate control line MG0 for a non-selecting word is set to be 0V. The byte selecting control line BS1 for a selecting word is set to be 12V to conduct a byte selecting transistor T1j, and the byte selecting control line BS0 for a non-selecting word is set to be 12V to non-conduct a byte selecting transistor T0j. A ground voltage of 0V of the circuit is applied to a source line SL0 and a bit line b0j for a selecting byte, and an erase inhibit voltage of 12V is applied to a source line SL1 and a bit line b1j for a non-selecting byte. Consequently, a high voltage is applied to a portion between a gate and a substrate so that the memory cell for the selecting byte of the selecting word is brought into an erase state. A high voltage is not applied to the portion between the gate and the substrate so that the non-selecting memory cell on the selecting word is not brought into the erase state.

Figure 17:
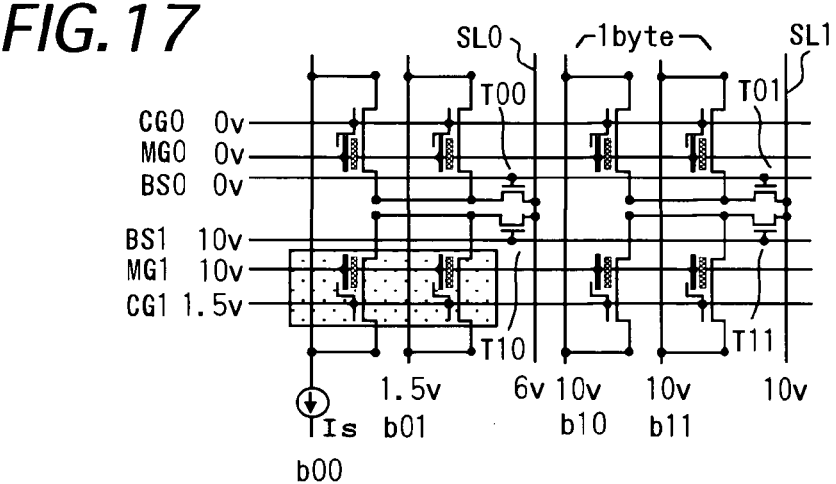
FIG. 17 is a circuit diagram illustrating a write processing state in the memory array of FIG. 16.

FIG. 17 illustrates a write processing state in a memory array in which the byte selecting transistor is provided on the source line side. For convenience, one byte selected by the byte selecting transistor T10 is shown as a write processing object. In this case, the memory gate control line MG1 for a selecting word is set to be 10V and the memory gate control line MG0 for a non-selecting word is set to be 0V. The byte selecting control line BS1 for a selecting word is set to be 10V to conduct the byte selecting transistor T10, and a write inhibit voltage of 10V is applied to the source line SL1 for a non-selecting byte. Consequently, a high voltage is not applied to a portion between a gate and a substrate so that a disturb is not applied to a write state non-selecting memory cell on the selecting word. On the other hand, if the source line SL0 for a selecting byte is set to be 6V, 6V is applied to a drain to be the source line connecting electrode (30) of the memory cell for a selecting byte. The bit line b01 of the write state non-selecting memory cell for the selecting byte is set to have an electric potential of 1.5V which is equal to the electric potential of the control gate control line CG1, and a current source Is is connected to the bit line b00 of the write state selecting memory cell for a selecting byte. Consequently, it is possible to achieve the write state by a hot carrier injection on the source side in the same manner as described above.

Figure 18:
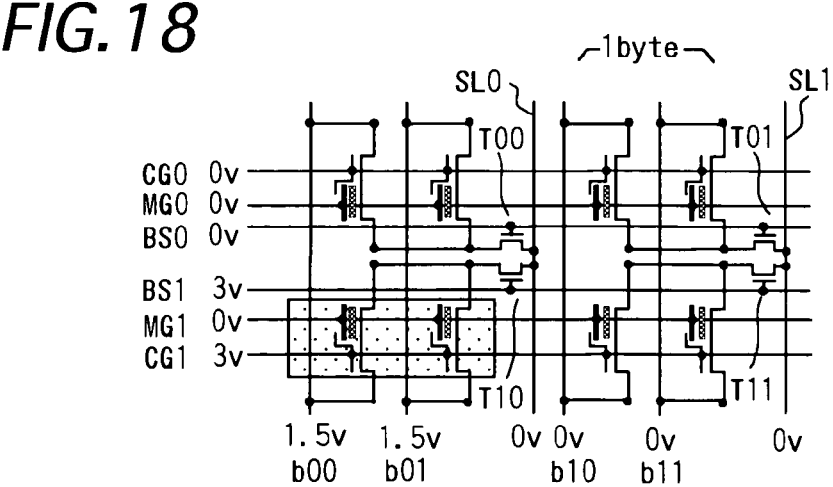
FIG. 18 is a circuit diagram illustrating a reading operation state in the memory array of FIG. 16.

FIG. 18 illustrates a reading operation state in a memory cell in which the byte selecting transistor is provided on the source line side. For convenience, a reading object is shown as one byte selected by the byte selecting transistor T10. In FIG. 18, the control gate control line CG1 for a selecting byte and the byte selecting control line BS1 are set to be a selection level of 3V, and the bit lines b00 and b01 for a selecting byte are precharged to 1.5V. Consequently, it is possible to carry out a read from the memory cell for a selecting byte. In a reading current path, two n-channel MOS type transistors having the selecting transistor portion 27 and the byte selecting transistor Tij are provided in series to the memory transistor 26. As compared with the examples of FIGS. 10 and 15, therefore, there is a difference in that the selection levels of CG1 and BS1 have a raised voltage of 3V.

Figure 19:
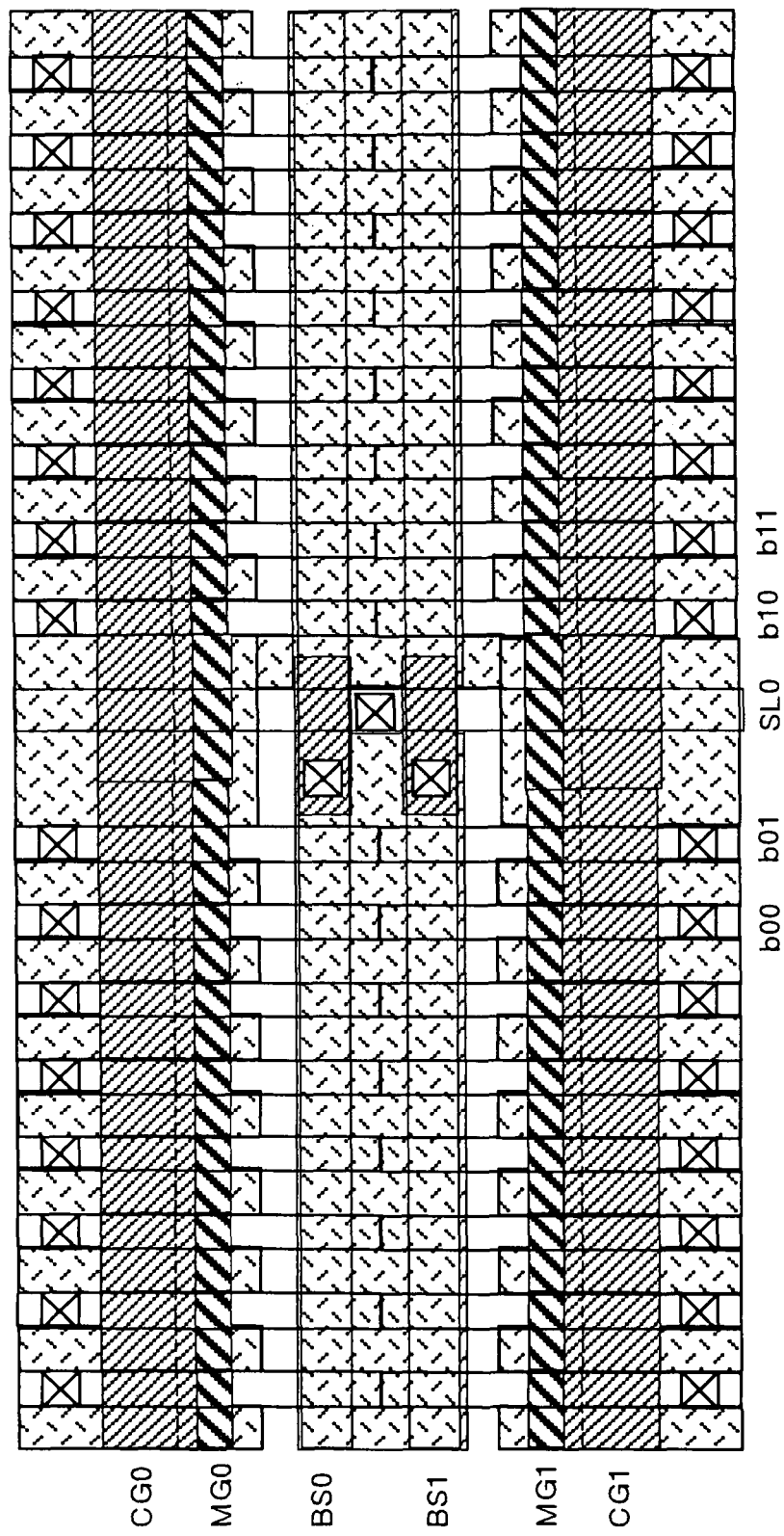
FIG. 19 is a planar layout diagram showing the device structure of a byte boundary portion in which a byte selecting transistor is provided in the memory array of FIG. 16.

FIG. 19 shows the planar layout of the device structure of a byte boundary portion in which the byte selecting transistor is arranged in the memory array in which the byte selecting transistor is provided on the source line side as described with reference to FIG. 16. Since the byte selecting transistor Tij has the same n-channel type as the memory cell, it can be formed in the same p-type well region.

Figure 20:
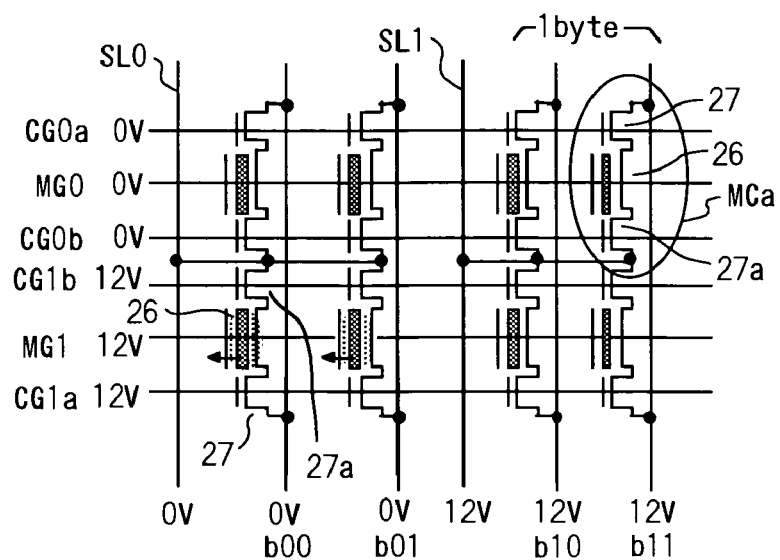
FIG. 20 is a circuit diagram showing the condition of a memory array in which a selecting transistor is provided on the common source line side of all of memory cells by taking an erasing operation state as an example.
Figure 21:
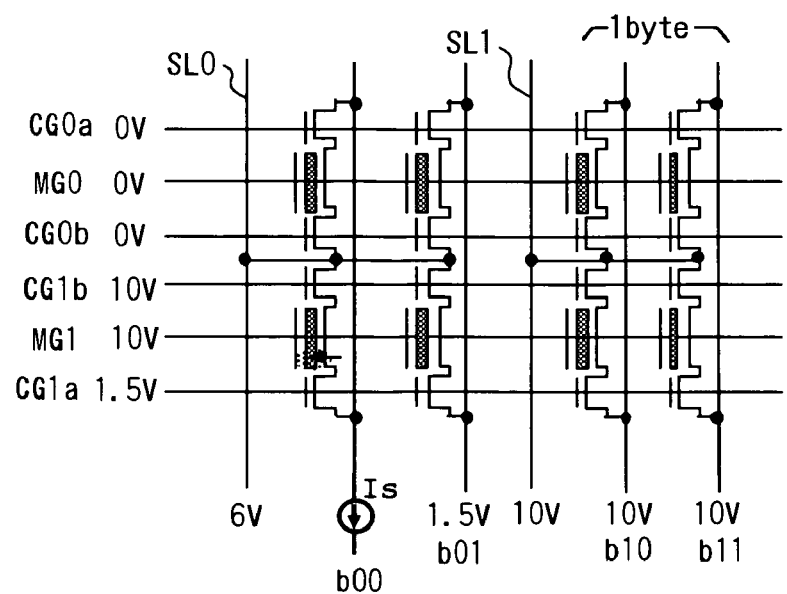
FIG. 21 is a circuit diagram illustrating a write processing state on a byte unit in the memory array of FIG. 20.
Figure 22:
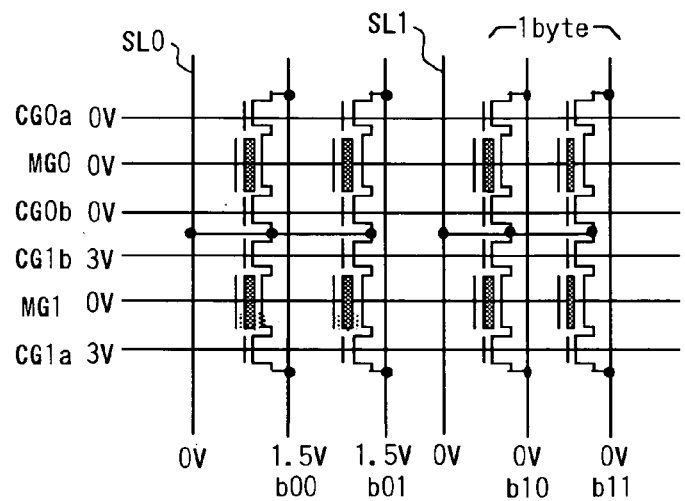
FIG. 22 is a circuit diagram illustrating a reading operation state on the byte unit in the memory array of FIG. 20.

FIG. 20 shows the state of a memory array in which a selecting transistor is provided on the common source line side of all the memory cells by taking an erasing operation state as an example. While the source line is separated every byte and the byte selecting transistor is added in the memory array described above, a selecting transistor portion 27a is formed on one of the sides of the memory transistor portion 26 having the other side to which the selecting transistor portion 27 is connected, and a memory cell MCa having a triple gate structure is employed. In the memory cell MCa, preferably, diffusion regions and control gate electrodes are formed symmetrically around the memory transistor portion 26 in the sectional structure of FIG. 3, and one of the diffusion regions is set to be a bit line connecting electrode and the other diffusion region is set to be a source line connecting electrode, which is not particularly shown. In brief, the control gate electrodes are provided on both sides of the memory gate electrode. In FIG. 20, a control gate control line CGia (i is an integer) controls the control gate of a selecting transistor portion to be connected to bit lines bj0 and bj1 (j is an integer), and a control gate control line CGib controls the control gate of the selecting transistor portion to be connected to a source line SLj. Control gate control lines CG0b and CG1b correspond to the byte selecting control lines BS0 and BS1 in the memory array of FIG. 16. An erase processing on a byte unit in the memory array of FIG. 20, a write processing on a byte unit shown in FIG. 21 and a reading operation on a byte unit shown in FIG. 22 are the same as the erase processing of FIG. 16, the write processing of FIG. 17 and the reading operation of FIG. 18.

Figure 23:
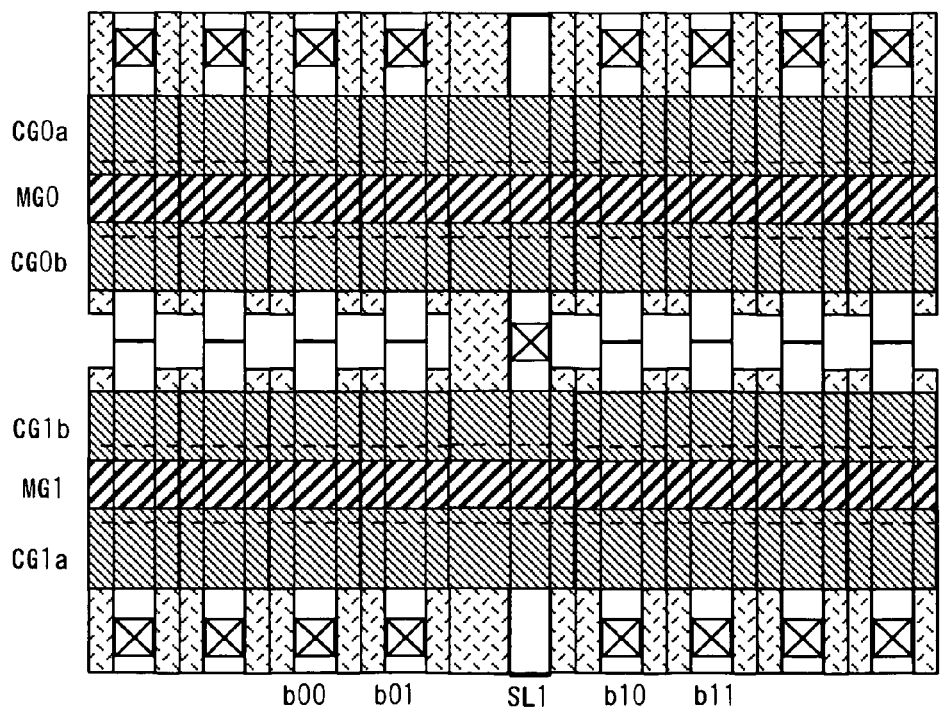
FIG. 23 is a planar layout diagram showing a device structure in the memory array of FIG. 20.

FIG. 23 shows the planar layout of a device structure in the memory array in which the selecting transistor is provided on the common source line side of the memory cell as described with reference to FIG. 20. The selecting transistor portion 27a constitutes a part of the memory cell MCa and is regularly arranged for all of the memory cells MCa. In case of FIG. 19, a chip area is increased in two directions having a longitudinal direction and a transverse direction in order to provide the byte selecting transistor Tij. Although the number of the selecting transistor portions 27a is large in FIG. 23, they are included in a memory cell array. Even if a dimension in the longitudinal direction is increased, therefore, a dimension in the transverse direction is not increased. In this respect, the area of the byte boundary region in the memory array structure of FIG. 23 can be more reduced than that in the example of FIG. 19.

<<Non-Volatile Memory Module>>

Figure 24:
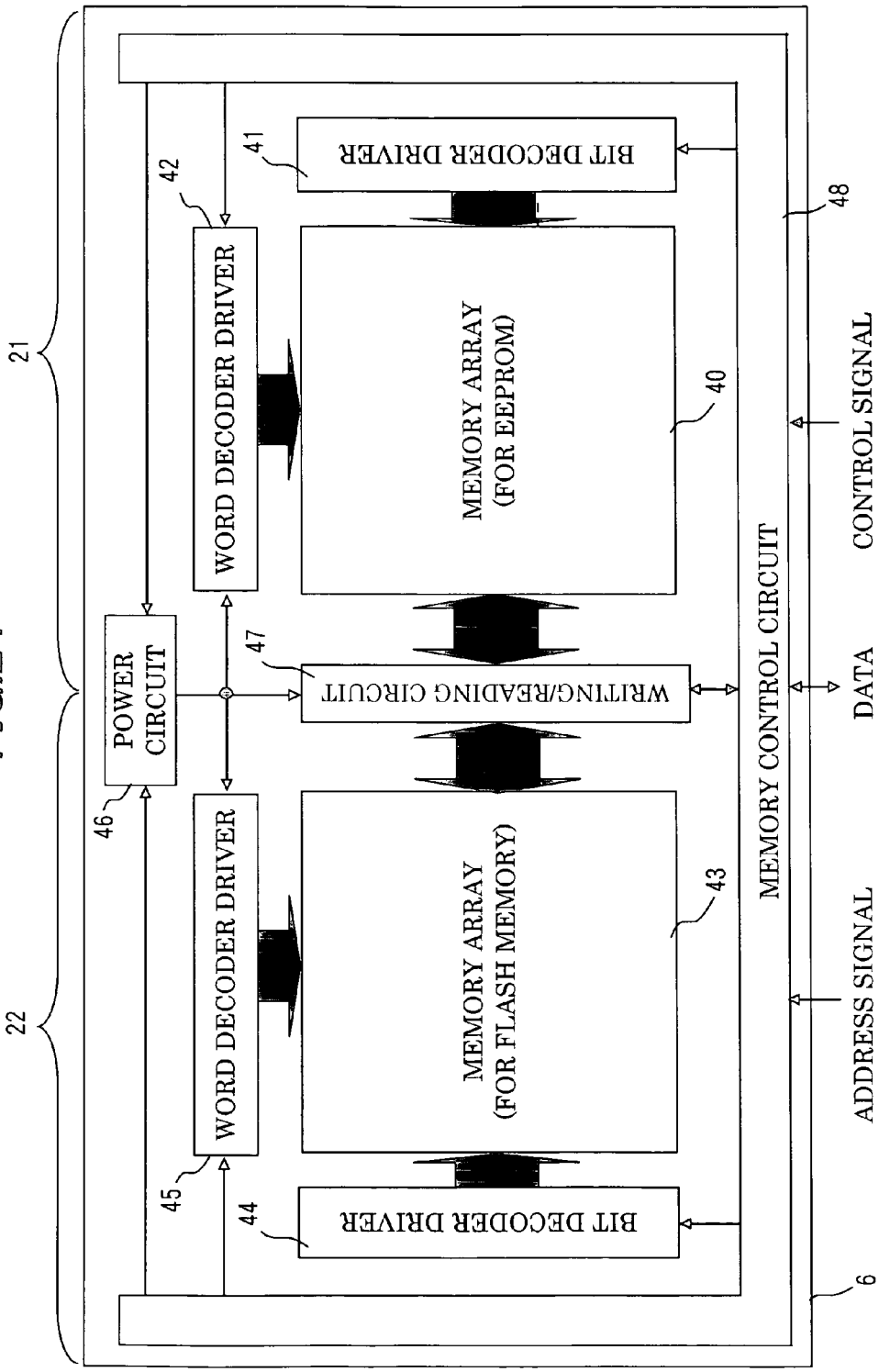
FIG. 24 is a block diagram showing a non-volatile memory module.

FIG. 24 is a block diagram illustrating the non-volatile memory module 6. The non-volatile memory module 6 has a memory array 40 for an EEPROM, a bit decoder driver 41 and a word decoder driver 42 as dedicated circuits to an EEPROM 21, and furthermore, a memory array 43 for a flash memory, a bit decoder driver 44 and a word decoder driver 45 as dedicated circuits to a flash memory 22. For the EEPROM 21 and the flash memory 22, a memory cell having the same split gate type MONOS structure as described above is used. Therefore, a power circuit 46, a writing/reading circuit 47 and a memory control circuit 48 are provided as circuits which are partially common to both of them, and peripheral circuits are partially made common, thereby contributing to a decrease in the size of the memory module, and furthermore, a reduction in a microcomputer chip.

Figure 25:
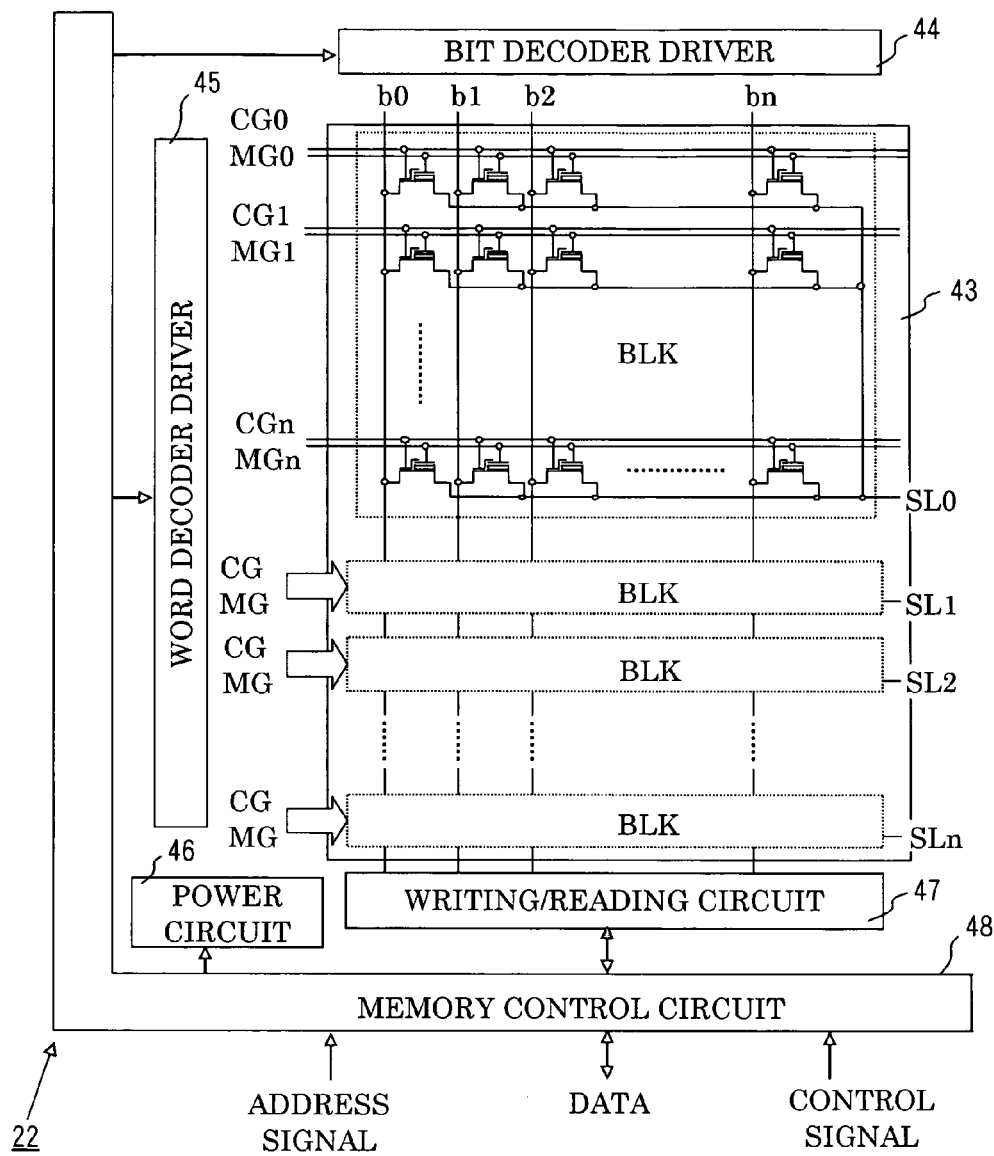
FIG. 25 is a block diagram illustrating a flash memory.

FIG. 25 illustrates an example of the flash memory 22. The memory array 43 has a basic structure described with reference to FIG. 6. The memory array 43 is divided into a plurality of erasing blocks BLK0 to BLKn, and source lines SL0 to SLn are provided on a block unit. The sizes of the erasing blocks BLK0 to BLKn may be equal to each other between the blocks or may be entirely or partially different from each other. Bit lines b0 to bn are common to the erasing blocks BLK0 to BLKn. A control gate control line CG and a memory gate control line MG are set onto a word (the direction of a memory cell array crossing the bit line) unit. For example, control gate control lines CG0 to CGn and memory gate control lines MG0 to MGn are assigned to the erasing block BLK0.

The bit decoder driver 44 decodes an address signal and drives a bit line in accordance with the result of the decoding and an operation mode. The word decoder driver 45 decodes an address signal and drives the control gate control line CG and the memory gate control line MG in accordance with the result of the decoding and an operation mode. For driving the source lines SL0 to SLn in the erase processing, the word decoder driver 45 is used, which is not particularly restricted. The writing/reading circuit 47 amplifies and outputs data read from the memory array in a reading operation and supplies a write current to a write state selecting bit line in a write processing.

The memory control circuit 48 inputs an address signal, data and a control signal and an instruction for the erase processing, the write processing or the read processing is given by a control signal, and necessary address signals for the bit decoder driver 44 and the word decoder driver 45 are given in accordance with the instruction and a necessary decoding operation is carried out to drive the control gate control line and the memory gate control line. A high voltage required for the operation is formed by raising a power voltage Vcc through the power circuit 46, and is supplied to a necessary circuit. The erase processing to be thus controlled is carried out on block units BLK0 to BLKn, and an erasing block is specified by using the predetermined upper bit of the address signal or the erasing block specifying data of an erasing command. The write processing is not particularly restricted but is set to be a page write on a 4-byte (32-bit) unit. In the write processing, it is necessary to supply a write current to a write selecting bit line. In consideration of the case in which the current supplying capability of the power circuit 46 is small, a serial write processing is carried out on a 4-byte unit for a write processing corresponding to one page. The reading operation is not particularly restricted but is carried out on a 32-bit unit specified by an address signal in accordance with a relationship with a data bus size.

Figure 26:
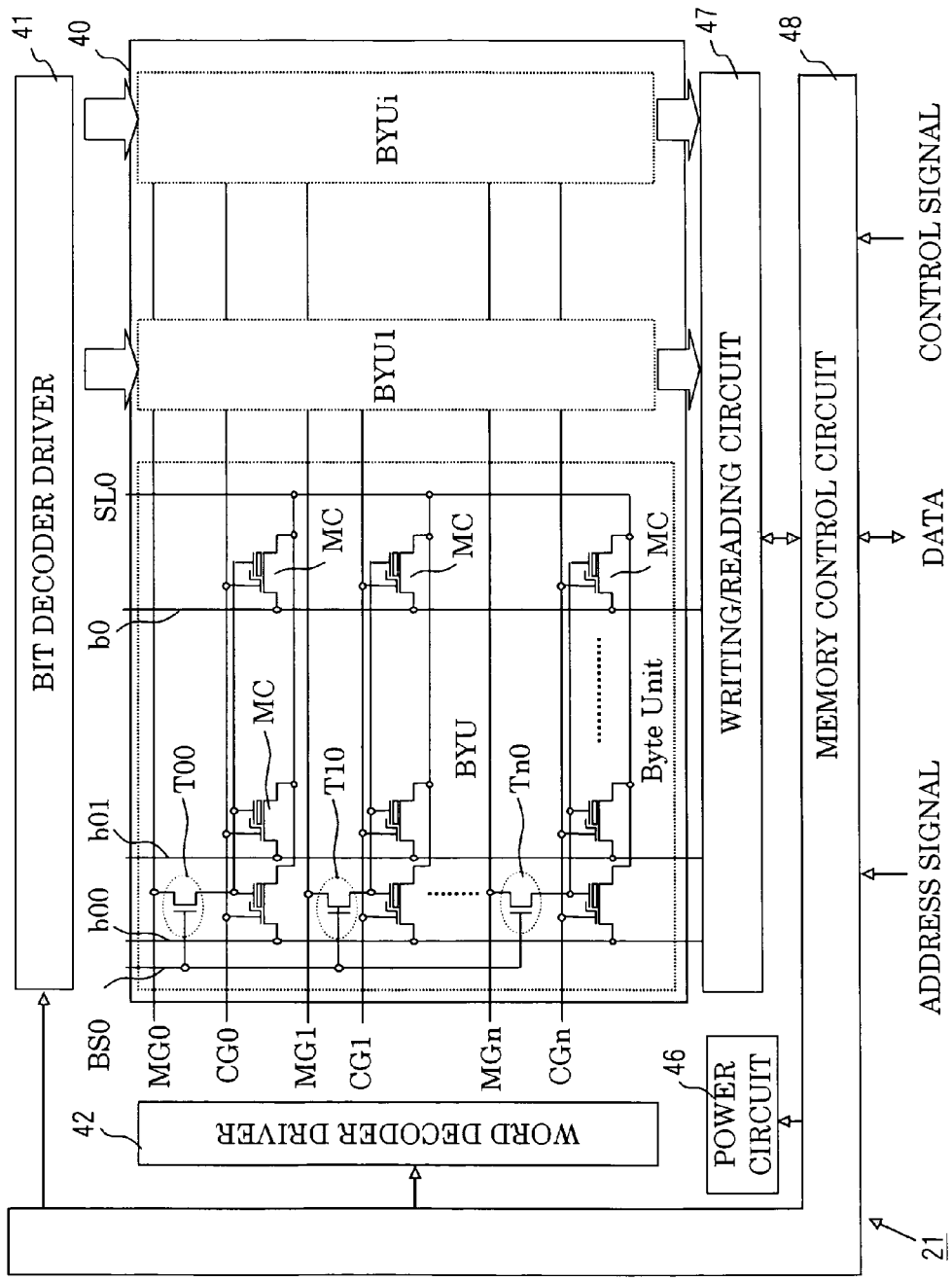
FIG. 26 is a block diagram illustrating an EEPROM.

FIG. 26 shows an example of the EEPROM 21. The memory array 40 has the basic structure described with reference to FIG. 13. The memory array 40 is divided into a plurality of byte units BYU0 to BYUi and source lines SL0 to SLn are provided on a unit of a unit. The control gate control lines CG0 to CGn and the memory gate control lines MG0 to MGn are set onto a word (the direction of a memory cell array crossing a bit line) unit and are made common to the byte units BYU0 to BYUi. Each of the byte units BYU0 to BYUi has the byte selecting transistors T00 to Tn0 for each of the control gate control lines CG0 to CGn, and has byte selecting control lines BS0 to BSi which are peculiar to the byte units BYU0 to BYUi. Furthermore, each of the byte units BYU0 to BYUi has eight bit lines bi0 to bi7.

The bit decoder driver 41 decodes an address signal and drives the bit line in accordance with the result of the decoding and an operation mode. The word decoder driver 42 decodes an address signal and drives the control gate control lines CG0 to CGn and the memory gate control lines MG0 to MGn in accordance with the result of the decoding and an operation mode. For driving the source lines SL0 to SLn in the erase processing, the bit decoder driver 41 is used, which is not particularly restricted. The writing/reading circuit 47 amplifies and outputs data read from the memory array 40 in the reading operation and supplies a write current to the write state selecting bit line in the write processing.

The memory control circuit 48 inputs an address signal, data and a control signal and an instruction for the erase processing, the write processing or the read processing is given by a control signal, and necessary address signals for the bit decoder driver 41 and the word decoder driver 42 are given in accordance with the instruction and a necessary decoding operation is carried out to drive the control gate control line and the memory gate control line. A high voltage required for the operation is formed by raising a power voltage Vcc through the power circuit 46, and is supplied to a necessary circuit. The erase, write and read processings to be thus controlled are carried out on a byte unit as described with reference to FIGS. 13 to 15. Moreover, the write processing and the read processing may be carried out on a 32-bit unit, for example, corresponding to a data bus width. The write processing and the read processing are carried out on the 32-bit unit corresponding to the data bus width. When data of less than 4 bytes are to be written or rewritten, it is preferable that write state non-selecting data should be given to mask a transition to a write state for data other than a writing object in a write processing on a 4-byte unit.

Figure 27:
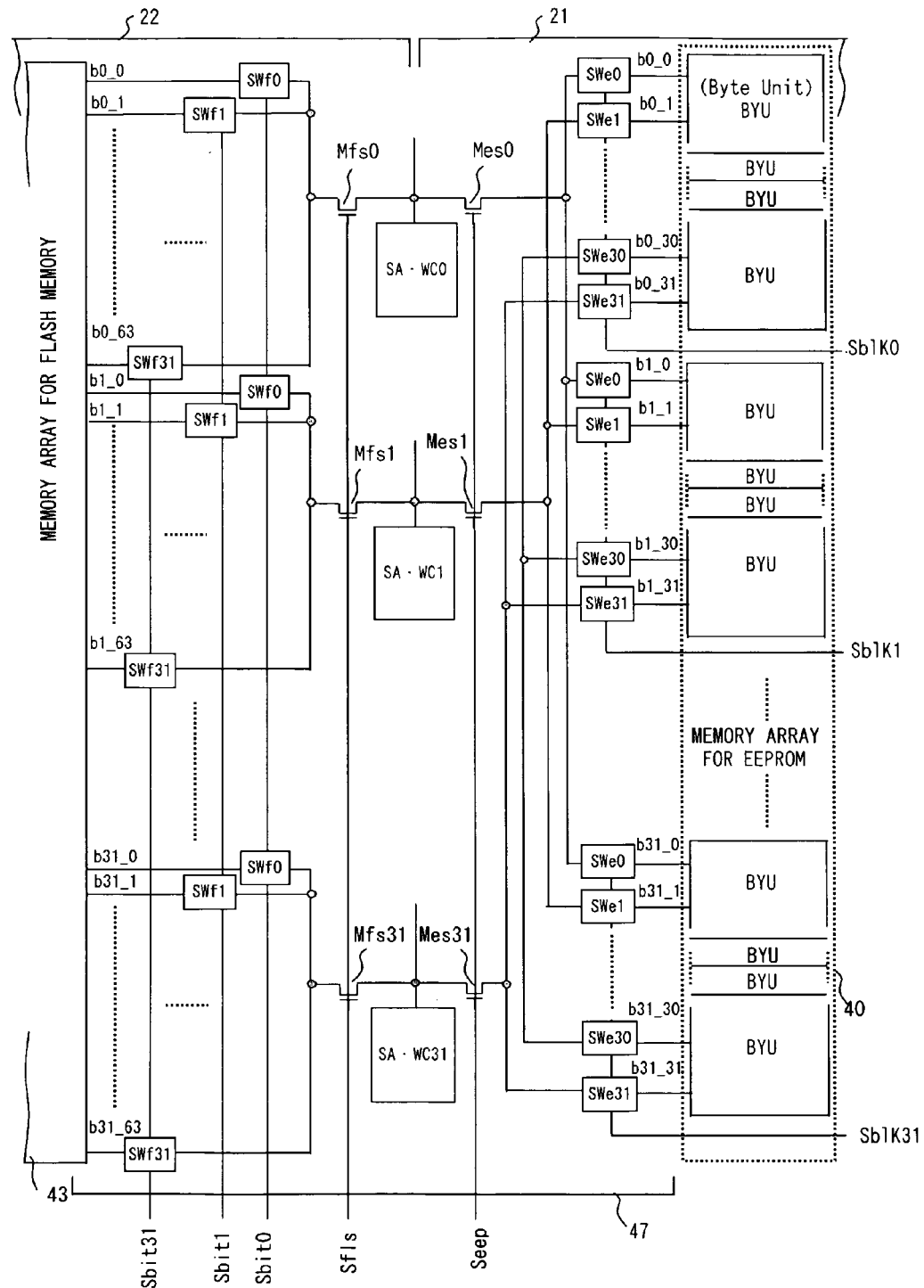
FIG. 27 is a block diagram illustrating a writing/reading circuit.

FIG. 27 shows an example of the writing/reading circuit 27. In general, a sense amplifier required for reading is not provided every bit line and a high order interface with a CPU gives access on a byte unit or a plural-byte (n×byte) unit. In respect of a reduction in a circuit scale, therefore, a sense amplifier required for reading and a constant current source circuit required for writing are correspondingly arranged in n×byte. FIG. 27 takes 32 bits of n=4 as an example. More specifically, the bit line of the flash memory 22 is set to be b0_0 to b31_63 and is divided into 32 groups on a 64 unit, and 32 bit lines in total can be selected one by one from each group through switches SWf0 to SWf31 in response to bit line selecting signals Sbit0 to Sbit31. The bit line of the EEPROM 21 is set to be b0_0 to b31_31, and 8 bit lines are sequentially assigned to each byte unit BYU having the same structure as the byte units BYU0 to BYUi described with reference to FIG. 26 and the whole memory array is divided into 32 blocks on a unit of a block setting four byte units BYU to be one unit and 32 bit lines are selected through the switches SWe0 to SWe31 on a block unit in response to block selecting signals Sblk0 to Sblk31.

The 32 bit lines on the EEPROM 21 side which are selected through the switches SWe0 to SWe31 are connected to corresponding sense amplifiers and write current sources SA•WC0 to SA•WC31 through selecting transistors Mes0 to Mes31. Similarly, the 32 bit lines on the flash memory 22 side which are selected through the switches SWf0 to SWf31 are connected to the corresponding sense amplifiers and write current sources SA•WC0 to SA•WC31 through selecting transistors Mfs0 to Mfs31. The selecting transistors Mes0 to Mes31 are controlled through the switches in response to an EEPROM selecting signal Seep, and the selecting transistors Mfs0 to Mfs31 are controlled through the switches in response to a flash memory selecting signal Sfls.

The bit decoder drivers 44 and 41 decode the address signals to generate the bit line selecting signals Sbit0 to Sbit31 and the block selecting signals Sblk0 to Sblk31. The memory control portion 48 generates the flash memory selecting signal Sfls and the EEPROM selecting signal Seep in accordance with an access address signal and an operation mode. In the example of FIG. 27, the flash memory selecting signal Sfls is set to have the selection level when an instruction for the write processing or the reading operation is given to the flash memory 22, and the EEPROM selecting signal Seep is set to have the selection level when the instruction for the write processing or the reading operation is given to the EEPROM 21.

Figure 28:
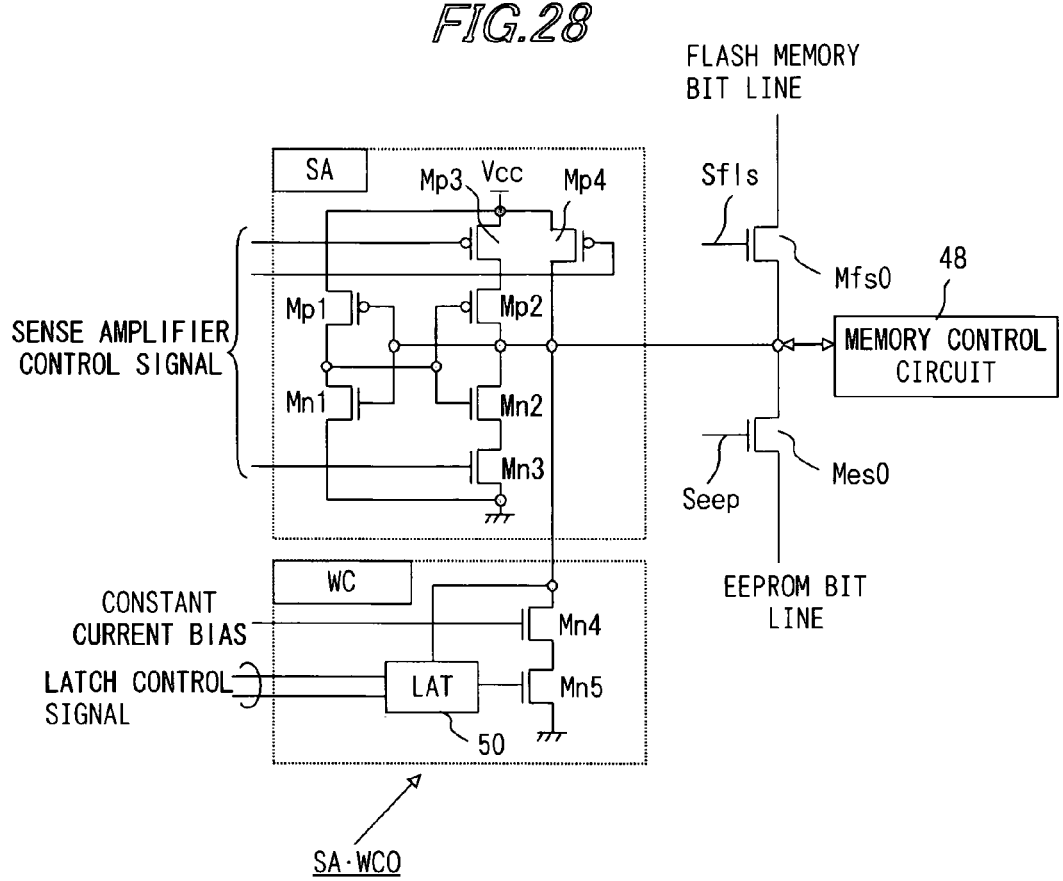
FIG. 28 is a circuit diagram showing an example of a sense amplifier and a write current source.

FIG. 28 shows an example of the sense amplifier and the write current source SA•WC0. In this example, a sense amplifier SA is constituted by p-channel type MOS transistors Mp1 and Mp2 and n-channel type MOS transistors Mn1 and Mn2 as main components, and p-channel type MOS transistors Mp3 and Mp4 and an n-channel type MOS transistor Mn3. Before the start of the reading operation, the input/output node of the sense amplifier SA is precharged to a power voltage Vcc by a precharge MOS transistor Mp4. Then, the MOS transistors Mp3 and Mn3 are turned ON so that the sense amplifier SA can be caused to carry out an amplifying operation. A write current source WC is constituted by connecting an n-channel type constant current source MOS transistor Mn4 and an n-channel type gate MOS transistor Mn5 in series between the input/output node of the sense amplifier SA and the grounding terminal of the circuit. A bias voltage for determining a constant current is applied to the gate of the constant current source MOS transistor Mn4. The gate MOS transistor Mn5 is controlled through a switch based on the latch data of a latch circuit (LAT) 50. The latch operation of the latch circuit is controlled by a latch clock and a latch enable signal. The latch circuit 50 latches write data supplied from the memory control portion 48 in the write processing. A logical value of "1" of the write data thus latched selects a write state in the write processing and a logical value of "0" of the write data does not select the write state in the write processing.

In the structure of FIG. 28, the sense amplifier SA and the write constant current source WC are connected in common to the coupling node of the selecting MOS transistors Mfs0 and Mes0. When one of the flash memory 22 and the EEPROM 21 caries out the reading operation, therefore, the other cannot carry out a write processing in parallel even if it can perform an erase processing in parallel with the reading processing. The other sense amplifiers and the write current sources SA•WC1 to SA•WC31 are also constituted in the same manner, which is not shown.

Figure 29:
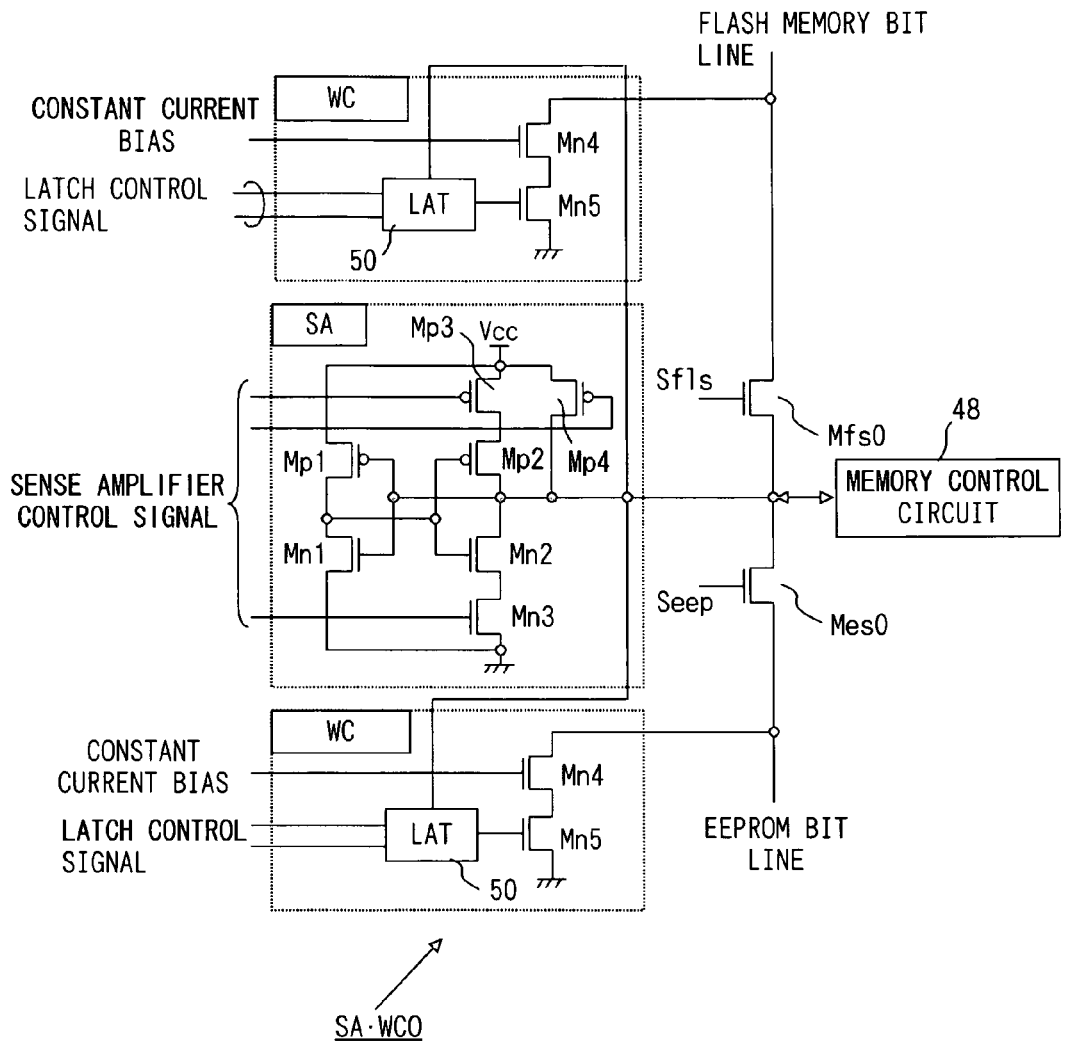
FIG. 29 is a circuit diagram showing another example of the sense amplifier and the write current source.

FIG. 29 shows another example of the sense amplifier and the write current source SA•WC0. This example is different from the structure in FIG. 28 in that the write current source WC is provided separately in the bit line of the flash memory 22 and that of the EEPROM 21. The latch input of write data to the latch circuit 50 is directly connected to the coupling node of the selecting MOS transistors Mfs0 and Mes0 without passing through both of them.

By the structure in FIG. 29, when one of the flash memory 22 and the EEPROM 21 carries out a reading operation, the other can perform the write processing in parallel. Furthermore, the flash memory 22 and the EEPROM 21 can carry out the write processing in parallel. In the same manner as the case of FIG. 28, the flash memory 22 and the EEPROM 21 can carry out the erase processing in parallel and the read processing and the erase processing can be performed in parallel with each other.

Figure 30:
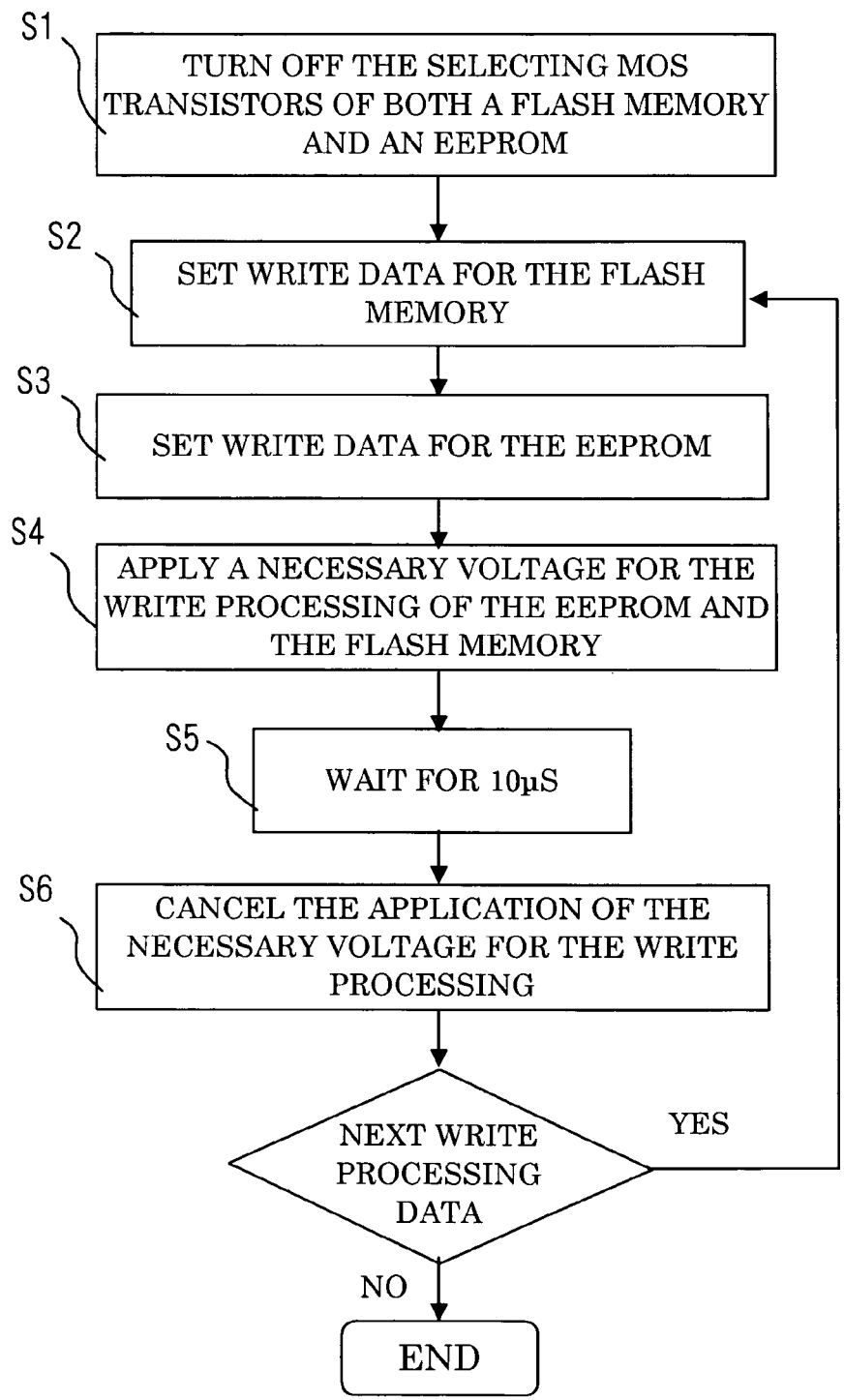
FIG. 30 is a flowchart showing the parallel write processing of the flash memory and the EEPROM.
Figure 31:
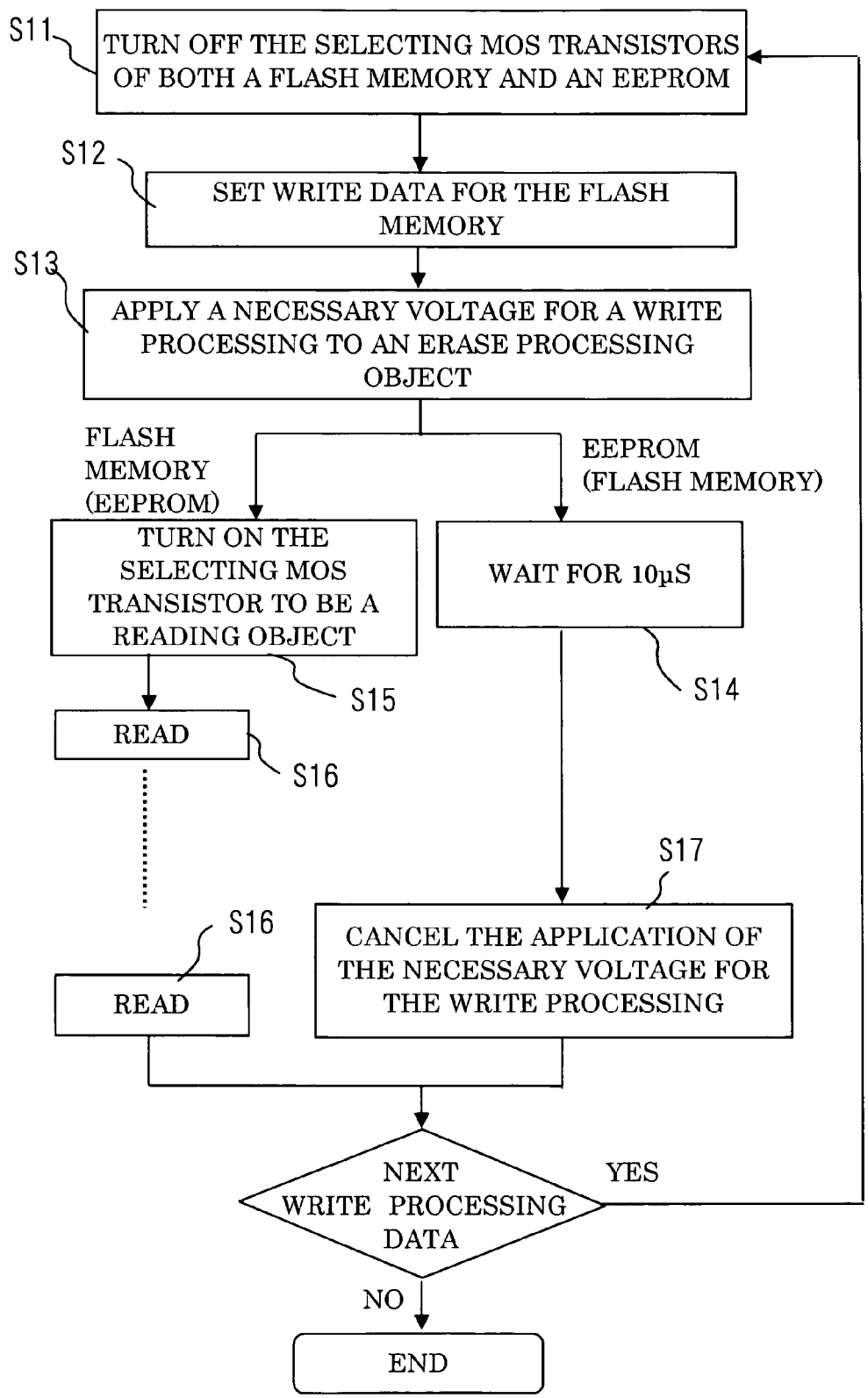
FIG. 31 is a flowchart showing the parallel write processing and reading operation of the flash memory and the EEPROM.
Figures 32, 33:
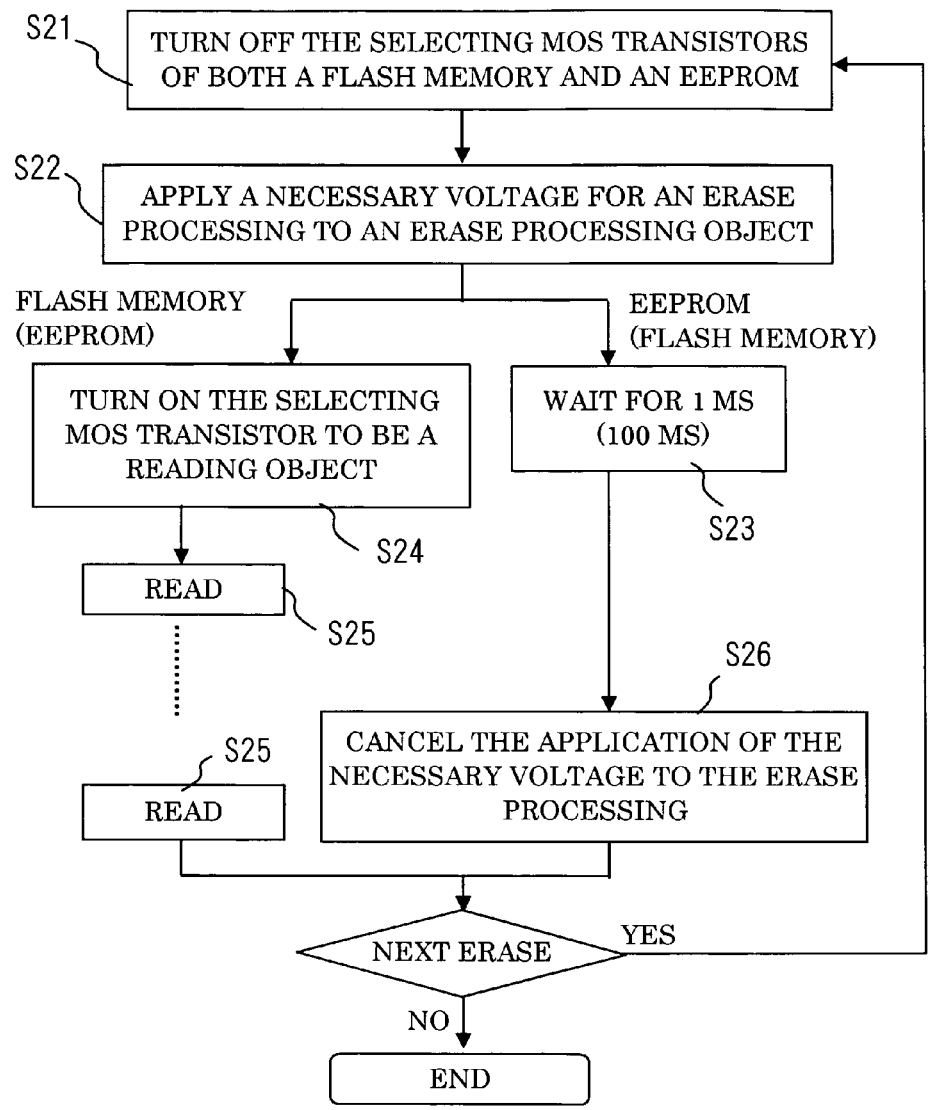
FIG. 32 is a flowchart showing the parallel erase processing and reading operation of the flash memory and the EEPROM.
FIG. 33 is an explanatory diagram illustrating the main access specifications of the flash memory and the EEPROM according to the processings of the flowcharts in FIGS. 30 to 32.

FIGS. 30 to 32 show the parallel access processing flows of the flash memory 22 and the EEPROM 21 when the circuit structure of FIG. 29 is employed. The main access specifications of the flash memory 22 and the EEPROM 21 at this time are shown in FIG. 33, for example.

FIG. 30 shows the parallel write processing flow of the flash memory 22 and the EEPROM 21. Both of the selecting MOS transistors Mfs0 to Mfs31 and Mes0 to Mes31 are turned OFF (S1) and 32-bit write data to the flash memory 22 are set from the memory control circuit 48 to the latch circuit 50 on the flash memory 22 side (S2). Similarly, 32-bit write data to the EEPROM 21 are set from the memory control circuit 48 to the latch circuit 50 on the EEPROM 21 side (S3). A write processing method for the flash memory 22 and the EEPROM 21 are the hot electron method as described above, and a high write processing voltage for generating a hot electron is applied to both of the memories 21 and 22, and furthermore, a constant current bias is applied to a write state selecting bit in accordance with the write data which are set to the flash memory 22 and the EEPROM 21 (S4). The voltage application state of the write processing is maintained for 10 μs (microseconds), for example (S5). The time of 10 μs fluctuates depending on a manufacturing process. For this reason, it is also possible to set a necessary time corresponding to the process. Then, the voltage application of the write processing is cancelled (S6) and the processing returns to the step S2 and continues if the write processing remains.

Thus, the parallel write processing is carried out for the flash memory 22 and the EEPROM 21. Consequently, a time required for the processing can be shortened to be almost half as compared with the case in which the processing is carried out separately.

FIG. 31 shows the flow of the parallel write processing and reading operation of the flash memory 22 and the EEPROM 21. Both of the selecting MOS transistors Mfs0 to Mfs31 and Mes0 to Mes31 are turned OFF (S11), and one of the flash memory 22 and the EEPROM 21 is set to be a write processing object and 32-bit write data are set from the memory control circuit 48 to the latch circuit 50 on the write processing object side (S12). The write processing method to the flash memory 22 and the EEPROM 21 is the hot electron method as described above, and a high write processing voltage for generating a hot electrode is applied to the write processing object, and furthermore, a constant current bias is applied to a write state selecting bit in accordance with the write data which are set (S13). The voltage application state of the write processing is maintained for 10 μs, for example (S14). In the meantime, the selecting MOS transistor is turned ON for the other reading object (S15) and a reading operation is carried out (S16). Then, the voltage application of the write processing is cancelled (S17), and the processing returns to the step S11 and continues if the write processing remains.

According to the parallel processing of FIG. 31, for example, in the case in which the flash memory 22 has an application program, the CPU 2 can be caused to perform the application program during the execution of the write processing by the EEPROM 21, thereby contributing to an increase in a software processing speed or a program executing speed.

FIG. 32 shows the flow of the parallel erase processing and reading operation of the flash memory 22 and the EEPROM 21. Both of the selecting MOS transistors Mfs0 to Mfs31 and Mes0 to Mes31 are turned OFF (S21), and one of the flash memory 22 and the EEPROM 21 is set to be an erase processing object and a high voltage required for the erase processing is applied to the erase processing object (S22). The voltage application state of the erase processing is maintained for 100 ms (milliseconds) in case of the flash memory 22 and for 1 ms in case of the EEPROM 21 (S23). In the meantime, the selecting MOS transistor is turned ON for the other reading object (S24) and a reading operation is carried out (S25). Then, the voltage application of the erase processing is cancelled (S26), and the processing returns to the step S21 and continues if a write processing remains.

According to the parallel processing of FIG. 32, the reading operation can be carried out over the flash memory 22 for 1 ms in which the EEPROM 21 is caused to execute the normal erase processing. Similarly, the reading operation can be carried out over the EEPROM 21 for 100 ms in which the flash memory 22 is caused to execute the normal erase processing. For example, in the case in which an application software is stored in the flash memory 22, the CPU 2 can be caused to execute the application software during the execution of the erase processing by the EEPROM 21 so that a software executing speed can be increased.

A time required for the erase processing also fluctuates depending on a process. For this reason, the time required for the erase processing is set in consideration of the influence. Moreover, the parallel erase processing, and the parallelism of the erase processing and the write processing can easily be carried out, which is not particularly shown.

Figure 34:
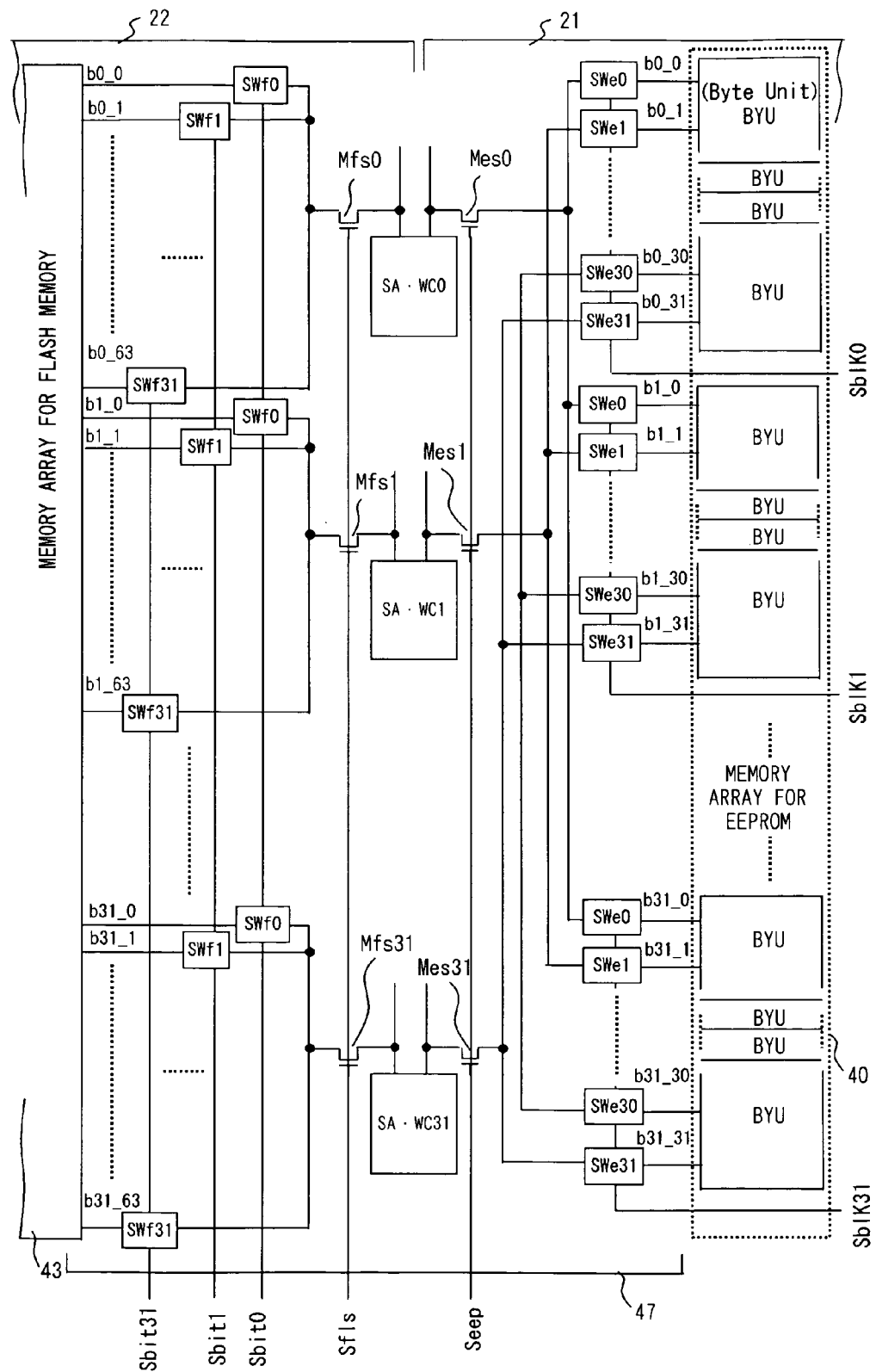
FIG. 34 is a circuit diagram showing another example of the writing/reading circuit.

FIG. 34 shows another example of the writing/reading circuit 27. While the static latch is utilized in a single end to constitute the sense amplifier SA in FIG. 27, the sense amplifier SA included in the sense amplifiers and write current sources SA•WC0 to SA•WC31 are set to be of a differential type in FIG. 34. In FIG. 34, an open-bit-line architecture is used. When the flash memory 22 is caused to carry out the reading operation, accordingly, a bit line potential (a reference potential) to be a reference in the sense amplifier utilizes the bit line of the EEPROM 21. To the contrary, when the EEPROM 21 is caused to carry out the reading operation, the bit line potential (the reference potential) to be the reference in the sense amplifier utilizes the bit line of the flash memory 22. The reference bit line potential or the reference potential can be set by utilizing a bit line precharging operation.

This method uses the differential type sense amplifier so that an increase in a reading operation speed can be more expected than the structure of the single end type sense amplifier in FIG. 27. In order to set a bit line potential to be a reference from the bit line of a memory other than a reading object memory, it is necessary to obtain a layout in such a manner that the bit line capacities and resistances of both of the memories 21 and 22 are equal to each other. In the case in which the reading operation is to be carried out, moreover, both the flash memory 22 and the EEPROM 21 use the bit line. For this reason, one of them cannot carry out the erase processing and the write processing in parallel while the other performs the reading operation.

Figure 35:
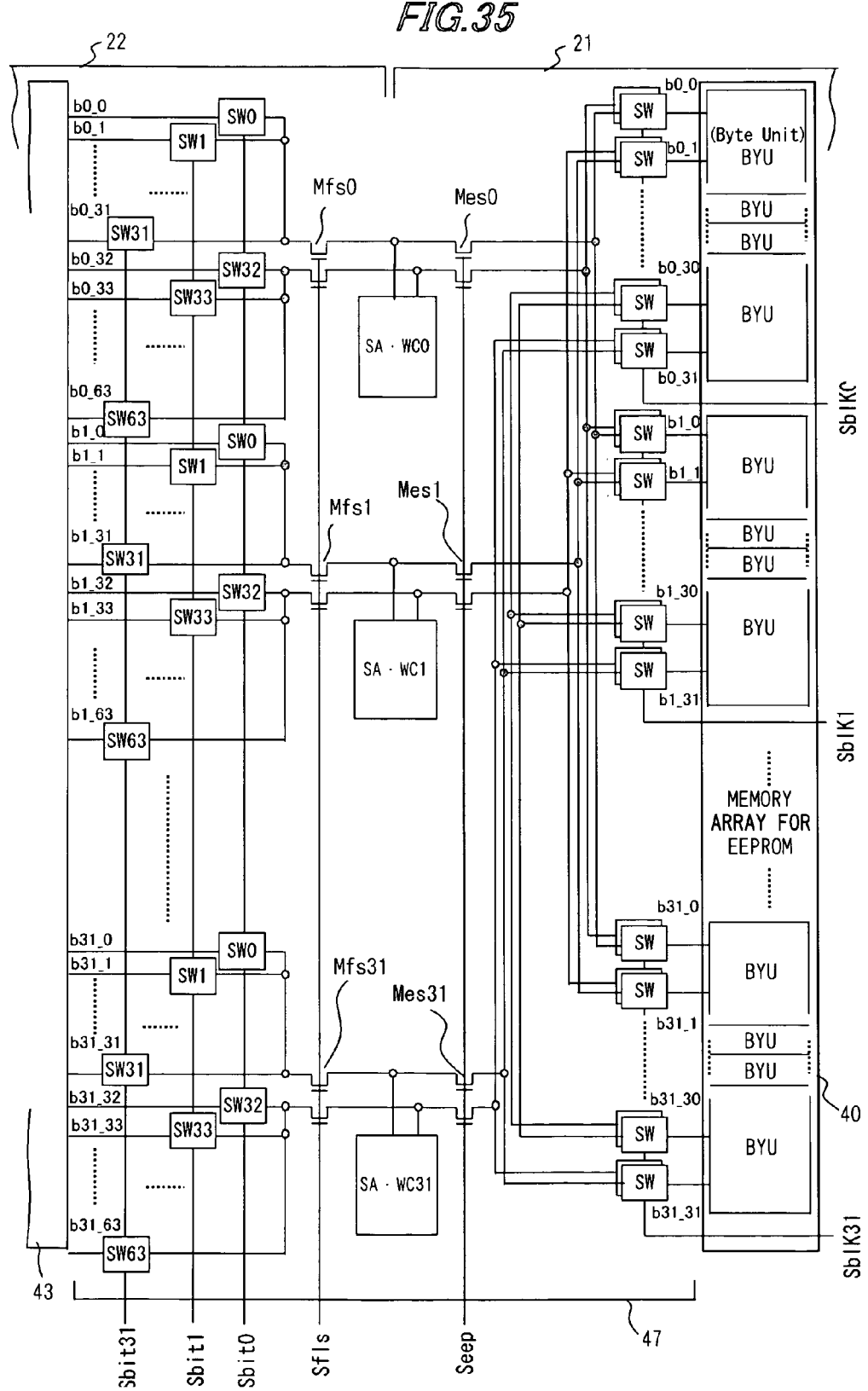
FIG. 35 is a circuit diagram showing a further example of the writing/reading circuit.

FIG. 35 shows a further example of the writing/reading circuit 27. Herein, a folded-bit-line architecture using a differential type sense amplifier is employed. In this structure, a reference bit line for giving a reference potential (a reference potential) uses bit lines in the same memory (the same kind of memory bit lines). In brief, 32 lower groups are assigned to one of differential inputs/outputs and 32 upper groups are assigned to the other differential input/output every block having 64 bit lines in the flash memory 22. In the EEPROM 21, each of the bit lines b0_0 to b31_31 is converted into a complementary signal and can be thus connected to the differential input/output terminals of the sense amplifier. The conversion into the complementary signal is not particularly restricted but is carried out together with the selecting operation of a switch SW.

By the structure of FIG. 35, it is possible to eliminate the drawbacks of the open-bit-line architecture in FIG. 34. More specifically, the reference bit line potential is set through the same kind of memories (reading object memories). For this reason, the bit line capacities and resistance may be different from each other in the flash memory 22 and the EEPROM 21. In this respect, it is not necessary to care about the layout of a module. Moreover, only the bit line of the reading object memory is used in the reading operation. Therefore, it is also possible to carry out the erase processing and the write processing in parallel with the reading operation.

Figure 36:
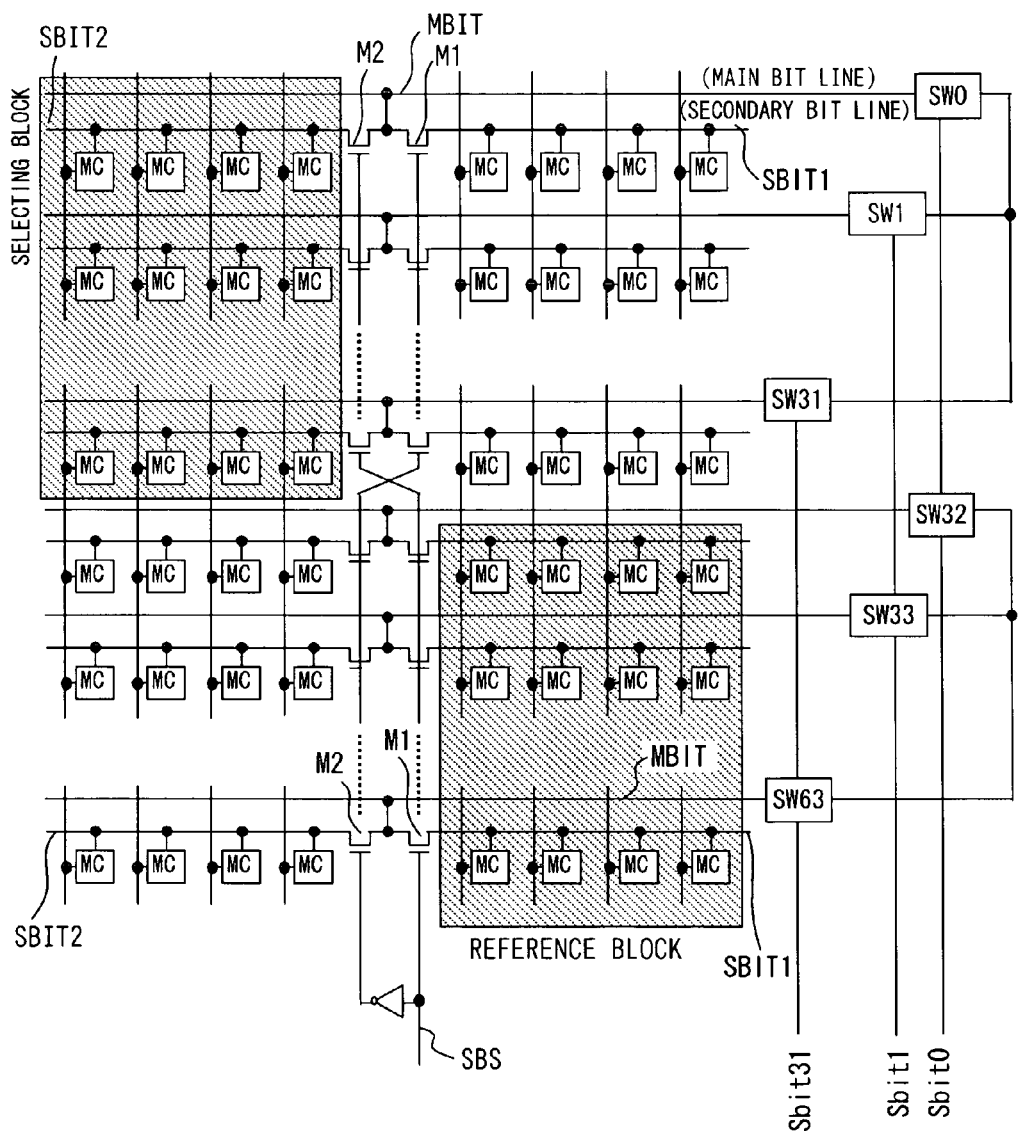
FIG. 36 is a circuit diagram showing an example of a method of selecting a memory cell in a flash memory having a folded-bit-line structure in FIG. 35.

FIG. 36 shows an example of a technique for selecting a memory cell in the flash memory 22 having the folded-bit-line structure in FIG. 35. Herein, a main and secondary bit line structure is employed, and secondary bit lines SBIT1 and SBIT2 can be selectively connected to a main bit line MBIT by selecting MOS transistors M1 and M2. The selecting MOS transistors M1 and M2 are selected in response to the non-inversion and inversion signals of a secondary bit line selecting signal SBS. In particular, the signal wirings of the non-inversion signal and the inversion signal of the secondary bit line selecting signal SBS cross each other in the middle, and a switch condition for the selecting MOS transistors M1 and M2 of the main bit line to switches SW0 to SW31 is reversed to a switch condition for the selecting MOS transistors M1 and M2 of the main bit line to the switches SW0 to SW31. When a differential amplification is to be carried out by the sense amplifier SA, consequently, it is possible to carry out a secondary bit line selection in a selecting block and a secondary bit line selection in a reference block (a reference block).

Figure 37:
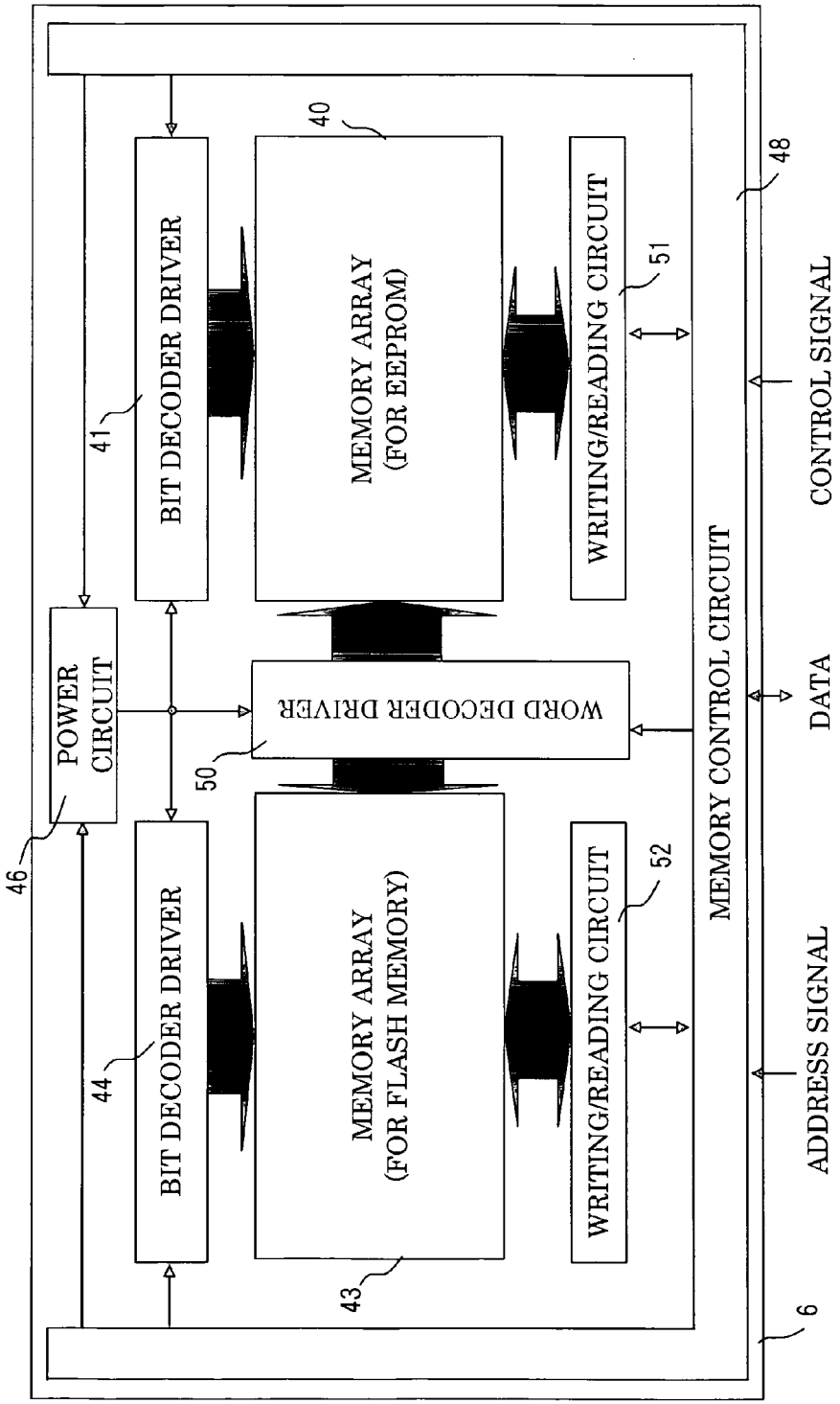
FIG. 37 is a block diagram showing another example of the non-volatile memory module.

FIG. 37 shows a further example of the non-volatile memory module. In a non-volatile memory module 6 shown in FIG. 37, a common circuit provided between a flash memory 22 and an EEPROM 21 is set to have a word decoder driver 50, a memory control portion 48 and a power supply portion 46. 51 and 52 denote a writing/reading circuit provided individually for the EEPROM 21 and the flash memory 22. In the case in which the word decoder driver 50 is made common, thus, the writing/reading circuits 51 and 52 can be set individually and it is possible to employ a sense amplifier which is peculiar to each of the EEPROM 21 and the flash memory 22. Accordingly, a reading speed can be varied in the flash memory 22 and the EEPROM 21. In the case in which a software is stored in the flash memory 22, for example, it is possible to increase the speed of a software processing by utilizing the sense amplifier for the flash memory 22 for a high speed processing.

<<Utilization Mode of Memory Module>>

Description will be given to the utilization mode of the non-volatile memory module 6. The EEPROM 21 is suitable for use in a region for storing data having a small size required for holding data for a long period of time such as an encryption key or the personal information of a user. It is suitable that information such as a program to be written in a large capacity at a high speed should be stored in the flash memory 22. It is preferable that memory cells to be used for both the EEPROM 21 and the flash memory 22 should have an identical process. The reason is that a common process is used and the number of masks can be thus reduced. By causing the power circuit 46, the word decoder driver 50 and the writing/reading circuit 47 to be common, it is possible to reduce a module area. By causing a bus interface to be common, moreover, it is possible to easily carry out a chip design.

As is represented by the microcomputer for an IC card, in the case in which the non-volatile memory module 6 is mounted on an SOC (system-on-chip) provided with a CPU, the uses of information to be stored by the flash memory 22 and the EEPROM 21 are distinguished from each other. For example, the flash memory 22 is utilized for the use for making the most of a feature such as a large capacity to store a program in a virtual machine language. Moreover, the EEPROM 21 is utilized for the uses for making the most of a feature such as a high reliability for holding data to store data for authentication and personal information.

Figure 38:
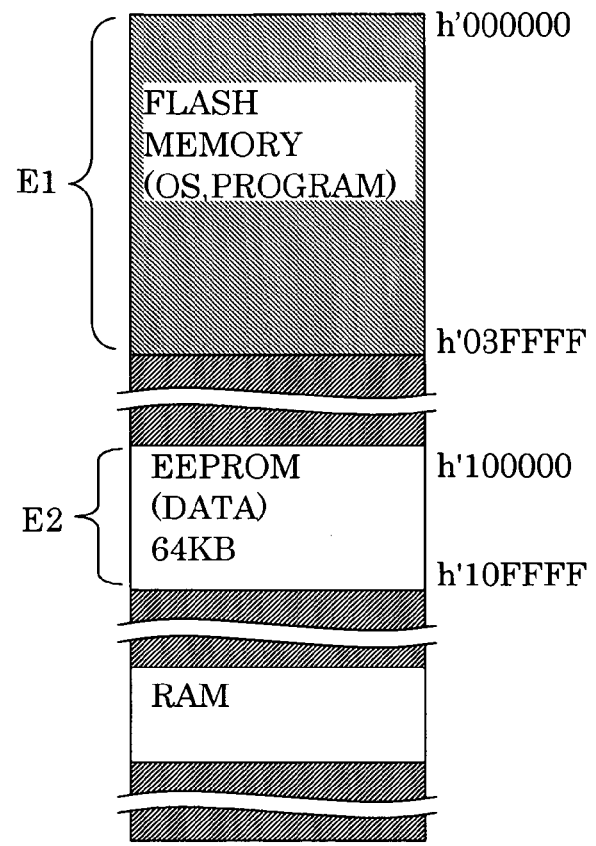
FIG. 38 is an explanatory diagram illustrating the mapping of the EEPROM and the flash memory in the address space of a CPU.

FIG. 38 shows an example of the mapping of the EEPROM 21 and the flash memory 22 in the address space of the CPU 2. The flash memory 22 is mapped into an address area E1 (for example, 256 KB (kilobytes)) and the EEPROM 21 is mapped into an address area E2 (for example, 64 KB) which is different therefrom. In this example, the lower 16 bits of address signals in the address areas E1 and E2 are made common.

Figure 39:
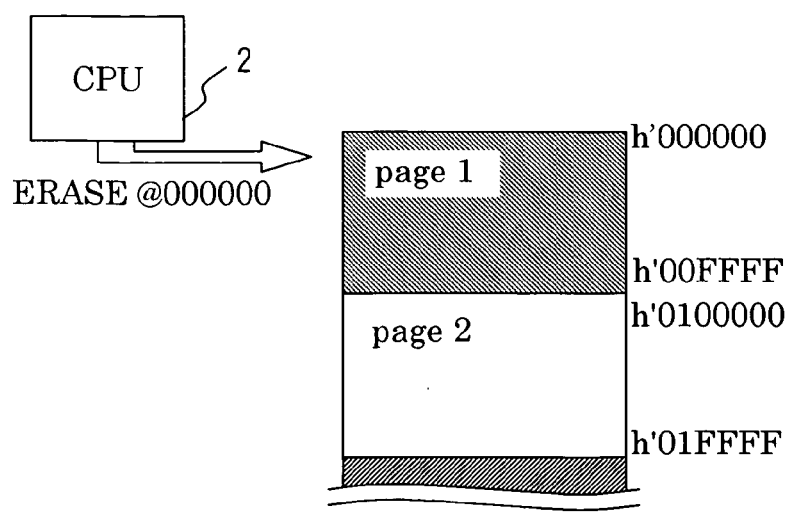
FIG. 39 is an explanatory diagram showing a first example of an erasing method to be carried out by the CPU.

FIG. 39 shows a first example of an erasing method to be carried out by the CPU 2. Herein, the CPU 2 issues a dedicated command to an erase. An instruction for an erase processing is given in a command code. An erasing object region, for example, an erasing object page of the flash memory or an erasing object byte of the EEPROM is specified as a command operand. In the case in which an erasing object address is to be specified, for example, a starting address (h'000000) in a page or an optional address (h'000000 to h'00FFFF) in a designated page is specified as an address to be specified in the erase of one page if the page has 64 KB of h'000000 to h'00FFFF. If priority is given to the prevention of a malfunction, a specifying method using a starting address is employed. If priority is given to the convenience of a user, a specifying method using an optional address in a designated page is employed.

Figure 40:
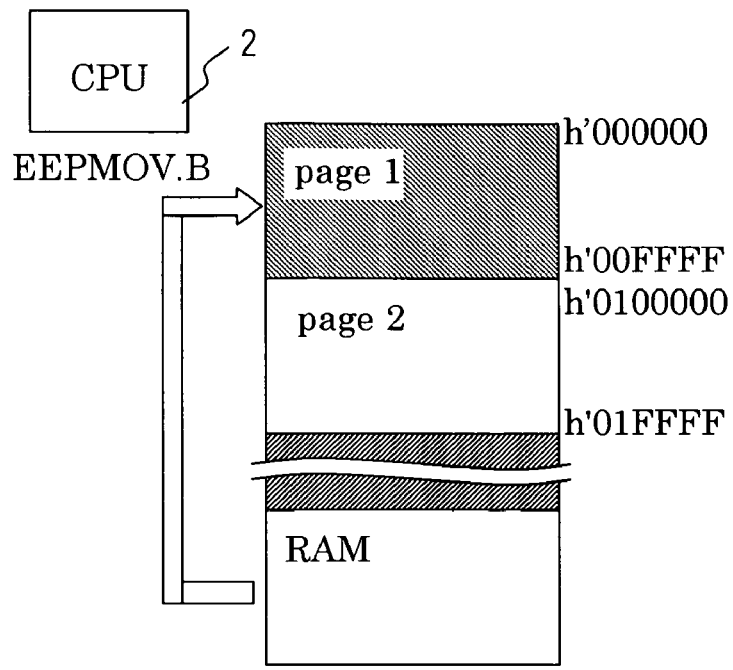
FIG. 40 is an explanatory diagram showing a second example of the erasing method to be carried out by the CPU.

FIG. 40 shows a second example of the erasing method to be carried out by the CPU 2. Herein, a block transfer instruction included in the instruction set of the CPU 2 is utilized. In brief, an instruction for a write processing is given to the flash memory 22 or the EEPROM 21 by using data on a logical value corresponding to an erase state. A transfer destination address acts as an erasing object address. In a block transfer, data on the logical value corresponding to the erase state is read and transferred from the RAM 4. In this case, the erasing operation of the memory cell at the transfer destination address is automatically carried out prior to a processing of writing data to the memory cell. Consequently, the data stored in the memory cell are erased and data to be newly written have a logical value corresponding to an erase state. As a result, the write to the memory cell in the erase state is not carried out but the erase in the memory cell is performed.

Figure 41:
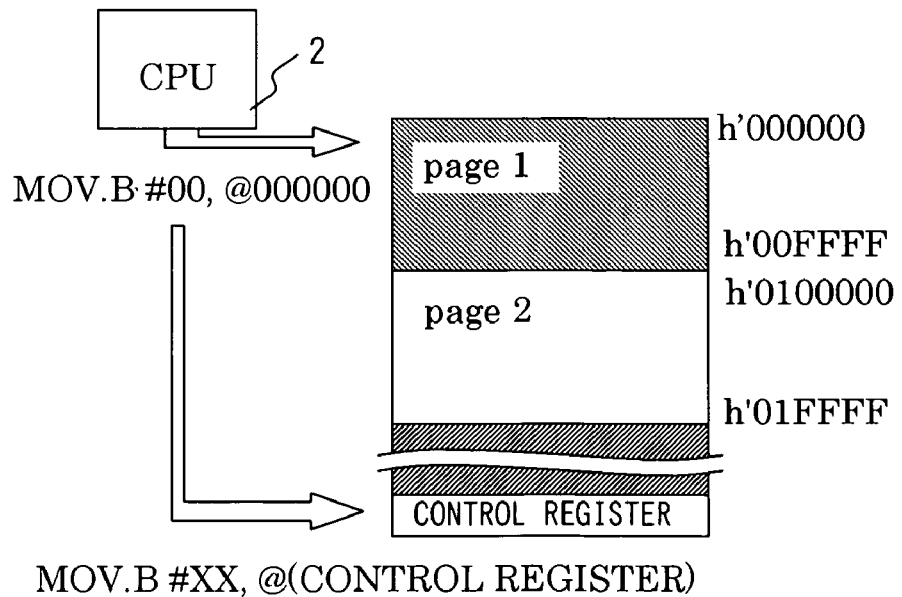
FIG. 41 is an explanatory diagram showing a third example of the erasing method to be carried out by the CPU.

FIG. 41 shows a third example of the erasing method to be carried out by the CPU 2. Herein, an instruction for an erasing object address for the flash memory 22 and the EEPROM 21 is given through a control register. The control register is mapped into the address space of the CPU 2 and is provided in the memory control portion 48, for example. The CPU 2 specifies a page to be an erasing object for the control register by using a data write instruction such as an MOV instruction. The CPU 2 issues the MOV instruction for designating the write of data corresponding to the erase state so that the erasing operation is specified.

Figure 42:
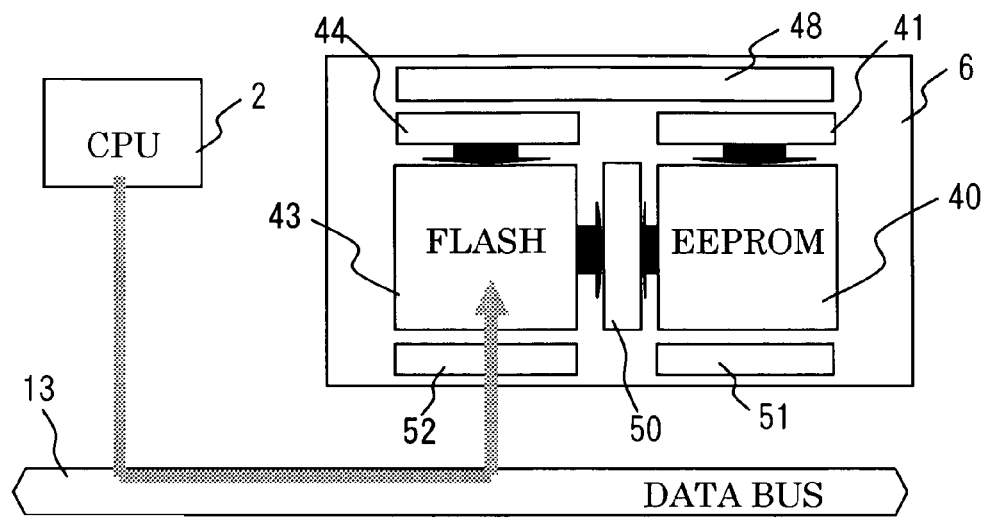
FIG. 42 is an explanatory diagram showing a first example of a writing method to be carried out by the CPU.

FIG. 42 shows a first example of a writing method to be carried out by the CPU 2. The write processing is specified by using a block transfer instruction included in the instruction set of the CPU 2. An address in which data for writing are stored is specified as the transfer source of a block transfer, and the address of the flash memory (FLASH) 22 or the EEPROM 21 is specified as a transfer destination. A write processing command is provided on the head of the block transfer. Upon receipt of a transfer end through a block transfer instruction, the flash memory 22 or the EEPROM 21 starts the write processing by using a write processing command and write data which are transferred. In the operation, an erase processing for a write processing region may be carried out before the write processing in addition to the write processing. In this case, the write is carried out for only a region specified by the block transfer after a relevant page is erased.

Figure 43:
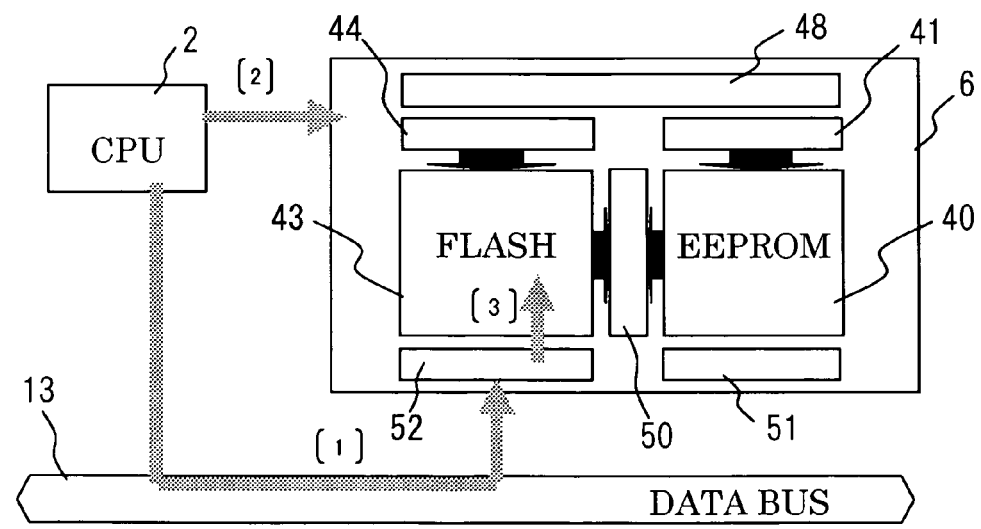
FIG. 43 is an explanatory diagram showing a second example of the writing method to be carried out by the CPU.

FIG. 43 shows a second example of the writing method to be carried out by the CPU 2. Herein, the writing operation is carried out through a control register possessed by the memory control portion 48 of the flash memory 22 or the EEPROM 21. The CPU 2 previously writes the write data to the flash memory 22 and the EEPROM 21 by using a data write instruction or a block transfer instruction ([1]). At this time, the write is set to be a processing of temporarily storing the write data to a buffer such as a flip-flop or a latch corresponding to one page without writing the data to a memory mat. Next, a code for a write processing is written to the control register of the flash memory 22 or the EEPROM 21 ([2]) so that a write processing ([3]) to the flash memory 22 or the EEPROM 21 is started.

Figure 44:
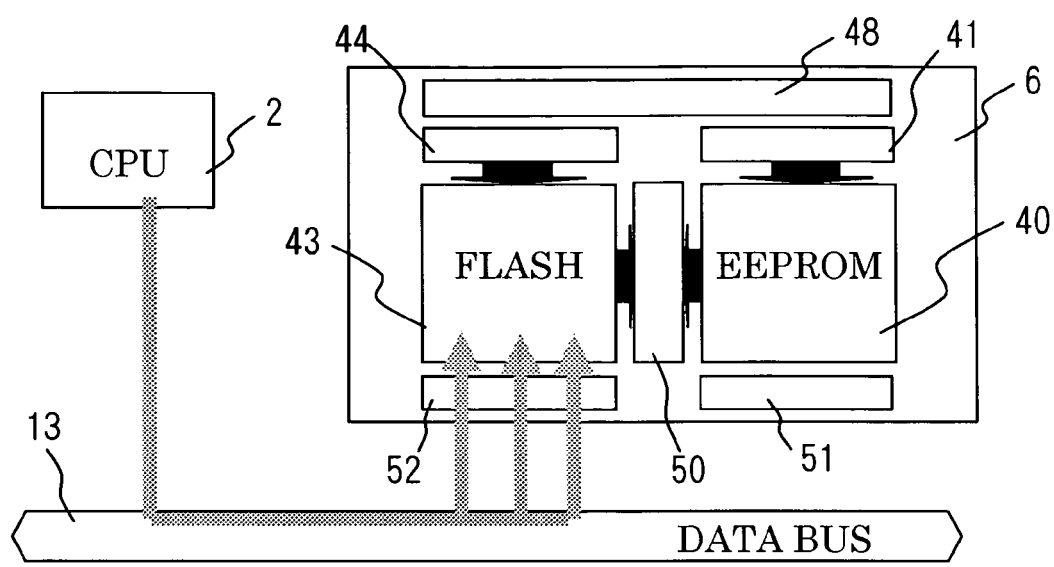
FIG. 44 is an explanatory diagram showing a third example of the writing method to be carried out by the CPU.

FIG. 44 shows a third example of the writing method to be carried out by the CPU 2. Herein, the CPU 2 issues an MOV instruction by setting the flash memory 22 as a target, thereby carrying out the write processing. In this case, the write processing is carried out equally to the size of data to be written by the same access method as a volatile memory such as an RAM. Every time the data are written from the CPU 2 to the flash memory 22 or the EEPROM 21, the writing operation is started in the flash memory 22 or the EEPROM 21. In order to implement the writing method, the memory control portion 48 is to have an interface function for supporting the implementation.

<<IC Card>>

Figure 45:
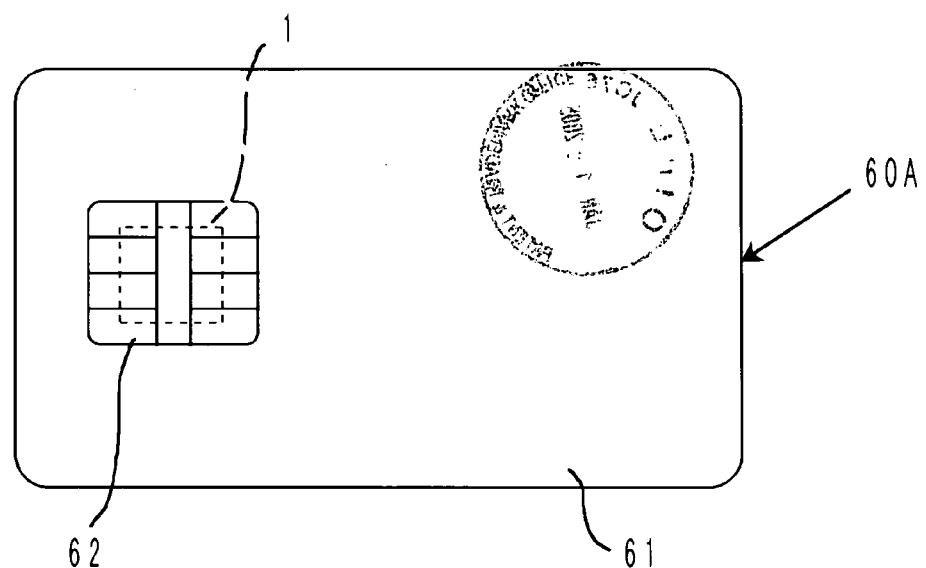
FIG. 45 is a planar view illustrating the appearance of an IC card in the form of a contact interface.

FIG. 45 illustrates the appearance of an IC card 60A in the form of a contact interface. In a card substrate 61 formed by a synthetic resin, a terminal 62 formed by an electrode pattern is exposed from a surface and the microcomputer 1 is embedded therein, which is not particularly restricted. The microcomputer 1 has the structure illustrated in FIG. 1. The corresponding external terminal of the microcomputer 1 is coupled to the electrode pattern.

Figure 46:
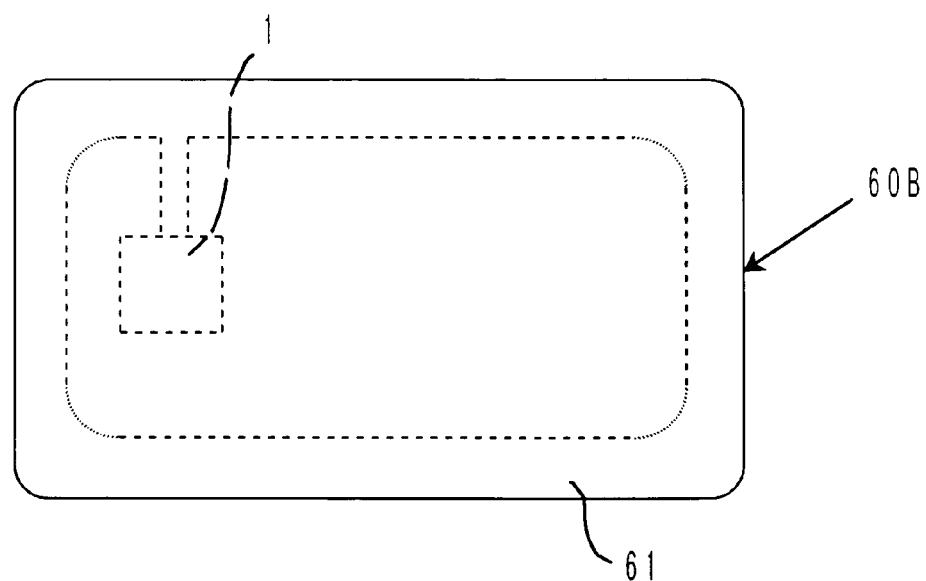
FIG. 46 is a plan view illustrating the appearance of the IC card in the form of a non-contact interface.

FIG. 46 illustrates the appearance of an IC card 60B in the form of a non-contact interface. An antenna 63 and the microcomputer 1 are embedded in a card substrate 60 formed by a synthetic resin, which is not particularly restricted. The microcomputer 1 has the structure illustrated in FIG. 2, and the antenna 63 is coupled to antenna terminals TML1 and TML2.

For example, when the IC cards 60A and 60B are utilized in an electronic money system, money data and a password are encrypted and stored in the EEPROM 21. When electronic money is to be utilized, the password and the money information are decoded and it is decided whether or not a proper utilization is carried out by using the information thus decoded, and a necessary amount of money is sent to a bank or a required amount of money is transferred to another IC card. A program for controlling such an encryption and decode processing, a host interface function, and a rewrite processing for the EEPROM 21 is stored in the flash memory 22. The program of the flash memory 22 is rewritten if necessary, for example, an upgrade is carried out.

When the IC cards 60A and 60B are attached to a cell phone and are thus used, moreover, the telephone number, ID number and accounting information of a user are encrypted and stored in the EEPROM 21. When the cell phone is used, the information are decoded and it is decided whether or not a proper utilization is carried out by using the information thus decoded, and the accounting information is updated corresponding to the number of times of a use and are encrypted again. Such a processing program is stored in the flash memory 22.

According to the IC card provided with the microcomputer 1, the flash memory 22 can be a product opened as a large capacity non-volatile memory to the user. In addition, the EEPROM 21 is also provided. Therefore, it is also possible to realize a high reliability for holding data.

According to the microcomputer 1 and the IC cards 60A and 60B described above, it is possible to cope with large capacity data by utilizing the flash memory 22. By utilizing the EEPROM 21, it is possible to enhance the reliability of write data. It is also possible to cope with a large scale application/data. For example, it is also possible to apply to an application to store and process large scale data such as a biological authentication for utilizing a fingerprint and the shape of a retina. The flash memory 22 and the EEPROM 21 can share a component circuit. Consequently, the area of the memory module 6 can be reduced. By causing the non-volatile memory cell to be common between the flash memory 22 and the EEPROM 21, it is possible to reduce the number of masks to be used in a manufacturing process. By causing the non-volatile memory cell to be common between the flash memory 22 and the EEPROM 21, it is possible to cause the pitches of the memory cells in both of the memory arrays to be equal to each other. Thus, the wiring pitches of signals for selecting the memory cells can be common between both of the memories 21 and 22. Consequently, it is easy to share a word driver by both of the memories 21 and 22.

While the invention made by the inventor has been specifically described above based on the example, the invention is not restricted thereto but various changes can be made without departing from the scope of the invention.

For example, the non-volatile memory cell is not restricted to an MONOS type using a separate gate but a memory using a floating gate may be employed.

The microcomputer according to the invention is not only provided as an SOC for an IC card but can have a structure in which a memory module mounting a flash memory and an EEPROM together is provided on the reader and writer side of the IC card and is connected to the microcomputer for the IC card via the reader and writer. In brief, it is also possible to give access to the microcomputer by externally providing the memory module mounting the flash memory and the EEPROM together.

It is also possible to set the memory module mounting the flash memory and the EEPROM together as a single chip and to connect a CPU or a memory controller in another chip so as to be used. In the microcomputer, a mask ROM as well as the non-volatile memory can be always mounted together.

Moreover, the CPU and the flash memory may be formed on one chip and the EEPROM may be formed on another chip, and they may be thus applied to the IC card.

Furthermore, the non-volatile memory is not restricted to the execution of information storage in a binary but the information storage may be carried out in a multivalue such as a four-value in one memory cell. Moreover, the electric charge storage insulating film is not restricted to a nitride film but may be an insulating film in which electric charge trapping particles are dispersed. Furthermore, the first data length is not restricted to a byte but may be a word (32 bits) or a long word (64 bits). Similarly, the second data length is not restricted to 1024 bits.

The invention can be widely applied to the microcomputer and the IC card.

What is claimed is:

1. A semiconductor processing device capable of inputting/outputting encrypted data from/to an outside of the device and formed over a semiconductor substrate, the device comprising:

a first non-volatile memory for erasing stored information on a first data length unit;

a second non-volatile memory for erasing stored information on a second data length unit; and a central processing unit, wherein the first non-volatile memory is used for storing an encryption key to be used for encrypting the data, and the second non-volatile memory is used for storing a program to be processed by the central processing unit, wherein each of the first non-volatile memory and the second non-volatile memory includes a plurality of non-volatile memory cells, wherein each of the non-volatile memory cells includes
a channel region between a first diffusion layer region and a second diffusion layer region which are formed on the substrate,
an electric charge storage layer over the channel region,
a first gate terminal over the electric charge storage layer,
a second gate terminal over the channel region,
a first insulating film on the channel region under the electric charge storage layer and the second gate terminal, and
a second insulating film between the electric charge storage layer and the first gate terminal, wherein the semiconductor processing device is constructed to carry out an operation for changing a threshold voltage of the memory cell by injecting a hot electron generated in the channel region provided under a third insulating film into the electric charge storage layer or by extracting an electric charge from the electric charge storage layer, wherein the first non-volatile memory includes
a plurality of bit lines;
a plurality of switch circuits;
a first control signal line;
a plurality of first control signal sub-lines; and
a second control signal line;
wherein each of the bit lines is coupled with corresponding non-volatile memory cells, wherein the first control signal line is coupled with corresponding first control signal sub-lines via a corresponding switch circuit, said switch circuit constructed to select among various ones of said first control signal sub-lines, wherein the first control signal sub-line is coupled with the first gate terminals of a predetermined number of the non-volatile memory cells in one row and a corresponding switch circuit, and wherein the second control signal line is coupled with the second gate terminal of the non-volatile memory cells in one row, and wherein the second non-volatile memory includes
a plurality of bit lines;
a third control signal line and a fourth control signal line,
wherein each of the bit lines is coupled with corresponding non-volatile memory cells,
wherein the third control signal line is coupled with the first gate terminal of the non-volatile memory cells in one row, and
wherein the fourth control signal line is coupled with the second gate terminal of the non-volatile memory cells in one row, wherein one bit line in the first non-volatile memory and a corresponding one bit line in the second non-volatile memory are coupled with a same amplifier circuit and a programming circuit, and wherein one of the first non-volatile memory and the second non-volatile memory is capable of performing a read operation during performance of a program operation in the other.

2. The semiconductor processing device according to claim 1,
wherein the first non-volatile memory is further used for storing information to be utilized for specifying an individual.

3. The semiconductor processing device according to claim 2,
wherein a first data length is smaller than a second data length.

4. The semiconductor processing device according to claim 3, further comprising:
a terminal for input/output from/to an outside of the semiconductor processing device,
the program being supplied from the outside through the terminal and stored in the second non-volatile memory.

5. The semiconductor processing device according to claim 4,
wherein the central processing unit accesses the first non-volatile memory and the second non-volatile memory in parallel.

6. The semiconductor processing device according to claim 5,
wherein the first non-volatile memory has a memory array portion comprising a plurality of memory cells and a control portion for controlling access to a selected memory cell,
wherein the second non-volatile memory has a memory array portion comprising a plurality of memory cells and a control portion for controlling access to a selected memory cell, and
wherein the control portion of the first non-volatile memory and the control portion of the second non-volatile memory are at least partially common.

7. An IC card enclosed with a synthetic resin, comprising:
a first non-volatile memory for erasing stored information on a first data length unit;
a second non-volatile memory for erasing stored information on a second data length unit;
a central processing unit; and
a terminal for inputting/outputting data from/to an outside of the IC card,
wherein encrypted data are input/output from/to the outside of the IC card,
wherein the first non-volatile memory is used for storing an encryption key to be utilized for encrypting the data, and the second non-volatile memory is used for storing a program to be processed by the central processing unit,
wherein each of the first non-volatile memory and the second non-volatile memory includes a plurality of non-volatile memory cells,
wherein each of the non-volatile memory cells includes
a channel region between a first diffusion layer region and a second diffusion layer region which are formed on the substrate,
an electric charge storage layer over the channel region,
a first gate terminal over the electric charge storage layer,
a second gate terminal over the channel region,
a first insulating film on the channel region under the electric charge storage layer and the second gate terminal, and
a second insulating film between the electric charge storage layer and the first gate terminal,
wherein the semiconductor processing device is constructed to carry out an operation for changing a threshold voltage of the memory cell by injecting a hot electron generated in the channel region provided under a third insulating film into the electric charge storage layer or by extracting an electric charge from the electric charge storage layer,
wherein the first non-volatile memory includes
a plurality of bit lines;
a plurality of switch circuits;
a first control signal line;
a plurality of first control signal sub-lines; and
a second control signal line,
wherein each of the bit lines is coupled with corresponding non-volatile memory cells,
wherein the first control signal line is coupled with corresponding first control signal sub-lines via a corresponding switch circuit, said switch circuit constructed to select among various ones of said first control signal sub-lines,
wherein the first control signal sub-line is coupled with the first gate terminals of a predetermined number of the non-volatile memory cells in one row and a corresponding switch circuit, and
wherein the second control signal line is coupled with the second gate terminal of the non-volatile memory cells in one row, and
wherein the second non-volatile memory includes
a plurality of bit lines; and
a third control signal line and a fourth control signal line,
wherein the third control signal line is coupled with the first gate terminal of the non-volatile memory cells in one row, and
wherein the fourth control signal line is coupled with the second gate terminal of the non-volatile memory cells in one row,
wherein one bit line in the first non-volatile memory and a corresponding one bit line in the second non-volatile memory are coupled with a same amplifier circuit and a programming circuit, and wherein one of the first non-volatile memory and the second non-volatile memory is capable of performing a read operation during performance of a program operation in the other.

8. An IC card enclosed with a synthetic resin, comprising:
a first non-volatile memory for erasing stored information on a first data length unit;
a second non-volatile memory for erasing stored information on a second data length unit;
a central processing unit; and
an antenna for inputting/outputting data from/to an outside of the IC card,
wherein encrypted data are input/output from/to the outside of the IC card,
wherein the first non-volatile memory is used for storing an encryption key to be utilized for encrypting the data, and the second non-volatile memory is used for storing a program to be processed by the central processing unit,
wherein each of the first non-volatile memory and the second non-volatile memory includes a plurality of non-volatile memory cells,
wherein each of the non-volatile memory cells includes
a channel region between a first diffusion layer region and a second diffusion layer region which are formed on the substrate,
an electric charge storage layer over the channel region,
a first gate terminal over the electric charge storage layer,
a second gate terminal over the channel region,
a first insulating film on the channel region under the electric charge storage layer and the second gate terminal, and
a second insulating film between the electric charge storage layer and the first gate terminal,
wherein the semiconductor processing device is constructed to carry out an operation for changing a threshold voltage of the memory cell by injecting a hot electron generated in the channel region provided under a third insulating film into the electric charge storage layer or by extracting an electric charge from the electric charge storage layer,
wherein the first non-volatile memory includes
a plurality of bit lines;
a plurality of switch circuits;
a first control signal line;
a plurality of first control signal sub-lines; and
a second control signal line,
wherein each of the bit lines is coupled with corresponding non-volatile memory cells,
wherein the first control signal line is coupled with corresponding first control signal sub-lines via a corresponding switch circuit, said switch circuit constructed to select among various ones of said first control signal sub-lines,
wherein the first control signal sub-line is coupled with the first gate terminals of a predetermined number of the non-volatile memory cells in one row and a corresponding switch circuit, and
wherein the second control signal line is coupled with the second gate terminal of the non-volatile memory cells in one row, and
wherein the second non-volatile memory includes
a plurality of bit lines; and
a third control signal line and a fourth control signal line,
wherein the third control signal line is coupled with the first gate terminal of the non-volatile memory cells in one row, and
wherein the fourth control signal line is coupled with the second gate terminal of the non-volatile memory cells in one row,
wherein one bit line in the first non-volatile memory and a corresponding one bit line in the second non-volatile memory are coupled with a same amplifier circuit and a programming circuit, and
wherein one of the first non-volatile memory and the second non-volatile memory is capable of performing a read operation during performance of a program operation in the other.

9. A semiconductor processing device capable of inputting/outputting encrypted data to/from an outside of the device, the device comprising:
a first non-volatile memory for erasing stored information on a first data length unit;
a second non-volatile memory for erasing stored information on a second data length unit; and
a central processing unit,
wherein each of the first non-volatile memory and the second non-volatile memory has a plurality of memory cells,
wherein each of the memory cells includes
a source region,
a drain region
a channel region between the source region and the drain region,
a data storage insulating layer and a first gate over the channel region, and
a second gate over the data storage insulating layer,
wherein each of the first non-volatile memory and the second non-volatile memory includes a plurality of first word lines, in which corresponding memory cells are connected to the first word lines when the stored information is erased from the first non-volatile memory, corresponding memory cells are connected to the first word lines when the stored information is erased from the second non-volatile memory, and a number of the memory cells to be connected to the first word lines in the first non-volatile memory is smaller than a number of the memory cells to be connected to the first word lines in the second non-volatile memory,
wherein the first non-volatile memory includes
a plurality of bit lines;
a plurality of switch circuits;
a first control signal line;
a plurality of first control signal sub-lines; and
a second control signal line,
wherein each of the bit lines is coupled with corresponding non-volatile memory cells,
wherein the first control signal line is coupled with corresponding first control signal sub-lines via a corresponding switch circuit, said switch circuit constructed to select among various ones of said first control signal sub-lines,
wherein the first control signal sub-line is coupled with the first gate terminals of a predetermined number of the non-volatile memory cells in one row and a corresponding switch circuit, and
wherein the second control signal line is coupled with the second gate terminal of the non-volatile memory cells in one row, and wherein the second non-volatile memory includes
a plurality of bit lines; and
a third control signal line and a fourth control signal line,
wherein the third control signal line is coupled with the first gate terminal of the non-volatile memory cells in one row, and
wherein the fourth control signal line is coupled with the second gate terminal of the non-volatile memory cells in one row,
wherein one bit line in the first non-volatile memory and a corresponding one bit line in the second non-volatile memory are coupled with a same amplifier and a programming circuit, and
wherein one of the first non-volatile memory and the second non-volatile memory is capable of performing a read operation during performance of a programming operation in the other.

10. The semiconductor processing device according to claim 9,
wherein the switch circuit is a MOS transistor of a same conductive type as the non-volatile memory cell.

11. A semiconductor processing device comprising:
a first non-volatile memory for erasing stored information on a first data length unit;
a second non-volatile memory for erasing stored information on a second data length unit;
a central processing unit; and
an external interface circuit,
wherein the first non-volatile memory is used for storing data, and the second non-volatile memory is used for storing a program to be processed by the central processing unit,
wherein each of the first non-volatile memory and the second non-volatile memory has a plurality of non-volatile memory cells,
wherein each of the non-volatile memory cells includes
a channel region between a first diffusion layer region and a second diffusion layer region which are formed on the substrate,
an electric charge storage layer over the channel region,
a first gate terminal over the electric charge storage layer,
a second gate terminal over the channel region,
a second insulating film between the electric charge storage layer and the first gate terminal, and
a third insulating film between the channel region and the second gate terminal,
wherein the semiconductor processing device is constructed to carry out an operation for changing a threshold voltage of the memory cell by injecting a hot electron generated in the channel region provided under a third insulating film into the electric charge storage layer or by extracting an electric charge from the electric charge storage layer,
wherein a first data length is smaller than a second data length,
wherein the first non-volatile memory includes
a plurality of bit lines;
a plurality of switch circuits;
a first control signal line;
a plurality of first control signal sub-lines; and
a second control signal line,
wherein each of the bit lines is coupled with corresponding non-volatile memory cells,
wherein the first control signal line is coupled with corresponding first control signal sub-lines via a corresponding switch circuit, said switch circuit constructed to select among various ones of said first control signal sub-lines,
wherein the first control signal sub-line is coupled with the first gate terminals of a predetermined number of the non-volatile memory cells in one row and a corresponding switch circuit, and
wherein the second control signal line is coupled with the second gate terminal of the non-volatile memory cells in one row, and
wherein the second non-volatile memory includes
a plurality of bit lines; and
a third control signal line and a fourth control signal line,
wherein the third control signal line is coupled with the first gate terminal of the non-volatile memory cells in one row, and
wherein the fourth control signal line is coupled with the second gate terminal of the non-volatile memory cells in one row,
wherein one bit line in the first non-volatile memory and a corresponding one bit line in the second non-volatile memory are coupled with a same amplifier and a programming circuit, and
wherein one of the first non-volatile memory and the second non-volatile memory is capable of performing a read operation during a programming operation in the other.

12. The semiconductor processing device according to claim 11,
wherein a gate breakdown voltage of the second gate terminal is lower than that of the first gate terminal.

13. The semiconductor processing device according to claim 12,
wherein the gate breakdown voltage of the second gate terminal is equal to that of a MOS transistor included in the central processing unit.

14. An IC card enclosed with a synthetic resin, comprising:
a first non-volatile memory for erasing stored information on a first data length unit;
a second non-volatile memory for erasing stored information on a second data length unit;
a central processing unit; and
a terminal for inputting/outputting data from/to an outside of the IC card,
wherein the first non-volatile memory is used for storing data, and the second non-volatile memory is used for storing a program to be processed by the central processing unit,
wherein each of the first non-volatile memory and the second non-volatile memory has a plurality of non-volatile memory cells,
wherein each of the non-volatile memory cells includes
a first channel region between a first diffusion layer region and a second diffusion layer region which are formed on the substrate,
an electric charge storage layer over the first channel region,
a first gate terminal over the electric charge storage layer,
a second gate terminal over a second channel region which is adjacent to the first channel region provided under the electric charge storage layer,
a first insulating film between the first channel region and the electric charge storage layer,
a second insulating film between the electric charge storage layer and the first gate terminal, and a third insulating film between the second channel region and the second gate terminal, wherein the semiconductor processing device is constructed to carry out an operation for changing a threshold voltage of the memory cell by injecting a hot electron generated in the channel region provided under a third insulating film into the electric charge storage layer or by extracting an electric charge from the electric charge storage layer, wherein a first data length is smaller than a second data length, wherein the first non-volatile memory includes
a plurality of bit lines;
a plurality of switch circuits;
a first control signal line;
a plurality of first control signal sub-lines; and
a second control signal line,
wherein each of the bit lines is coupled with corresponding non-volatile memory cells,
wherein the first control signal line is coupled with corresponding first control signal sub-lines via a corresponding switch circuit, said switch circuit constructed to select among various ones of said first control signal sub-lines,
wherein the first control signal sub-line is coupled with the first gate terminals of a predetermined number of the non-volatile memory cells in one row and a corresponding switch circuit, and
wherein the second control signal line is coupled with the second gate terminal of the non-volatile memory cells in one row, and wherein the second non-volatile memory includes
a plurality of bit lines; and
a third control signal line and a fourth control signal line,
wherein the third control signal line is coupled with the first gate terminal of the non-volatile memory cells in one row, and
wherein the fourth control signal line is coupled with the second gate terminal of the non-volatile memory cells in one row, wherein one bit line in the first non-volatile memory and a corresponding one bit line in the second non-volatile memory are coupled with a same amplifier circuit and a programming circuit, and wherein one of the first non-volatile memory and the second non-volatile memory is capable of performing a read operation during performance of a program operation in the other.

15. An IC card comprising:
a first non-volatile memory for erasing stored information on a first data length unit;
a second non-volatile memory for erasing stored information on a second data length unit;
a central processing unit; and
an antenna for inputting/outputting data from/to an outside of the IC card;

wherein the first non-volatile memory, second non-volatile memory, central processing unit, and antenna are enclosed with a synthetic resin, wherein the first non-volatile memory is used for storing data, and the second non-volatile memory is used for storing a program to be processed by the central processing unit, wherein each of the first non-volatile memory and the second non-volatile memory includes a plurality of non-volatile memory cells, wherein each of the non-volatile memory cells includes
a first channel region between a first diffusion layer region and a second diffusion layer region which are formed on the substrate,
an electric charge storage layer over the channel region,
a first gate terminal over the electric charge storage layer,
a second gate terminal over a second channel region which is adjacent to the first channel region provided under the electric charge storage layer, wherein the semiconductor processing device is constructed to carry out an operation for changing a threshold voltage of the memory cell by injecting a hot electron generated in the channel region provided under a third insulating film into the electric charge storage layer or by extracting an electric charge from the electric charge storage layer, wherein a first data length is smaller than a second data length, wherein the first non-volatile memory includes
a plurality of bit lines;
a plurality of switch circuits;
a first control signal line;
a plurality of first control signal sub-lines; and
a second control signal line,
wherein each of the bit lines is coupled with corresponding non-volatile memory cells,
wherein the first control signal line is coupled with corresponding first control signal sub-lines via a corresponding switch circuit, said switch circuit constructed to select among various ones of said first control signal sub-lines,
wherein the first control signal sub-line is coupled with the first gate terminals of a predetermined number of the non-volatile memory cells in one row and a corresponding switch circuit,
wherein the second control signal line is coupled with the second gate terminal of the non-volatile memory cells in one row, and wherein the second non-volatile memory includes
a plurality of bit lines; and
a third control signal line and a fourth control signal line,
wherein the third control signal line is coupled with the first gate terminal of the non-volatile memory cells in one row, and
wherein the fourth control signal line is coupled with the second gate terminal of the non-volatile memory cells in one row, wherein one bit line in the first non-volatile memory and a corresponding one bit line in the second non-volatile memory are coupled with a same amplifier circuit and a programming circuit, and wherein one of the first non-volatile memory and the second non-volatile memory is capable of performing a read operation during performance of a program operation in the other.

16. The semiconductor processing device according to claim 15,
wherein a gate breakdown voltage of the second gate terminal is lower than that of the first gate terminal.

17. The semiconductor processing device according to claim 16,
wherein the gate breakdown voltage of the second gate terminal is equal to that of a MOS transistor included in the central processing unit.

* * * * *